US012190820B2

(12) United States Patent
Wang et al.

(10) Patent No.: US 12,190,820 B2
(45) Date of Patent: Jan. 7, 2025

(54) PIXEL CIRCUIT, PIXEL DRIVING METHOD AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Benlian Wang, Beijing (CN); Yao Huang, Beijing (CN); Weiyun Huang, Beijing (CN); Ming Hu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/769,045

(22) PCT Filed: Apr. 26, 2021

(86) PCT No.: PCT/CN2021/089952

§ 371 (c)(1),
(2) Date: Apr. 14, 2022

(87) PCT Pub. No.: WO2022/226727

PCT Pub. Date: Nov. 3, 2022

(65) Prior Publication Data

US 2023/0028312 A1 Jan. 26, 2023

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2300/0426* (2013.01); *G09G 2300/0842* (2013.01)

(58) Field of Classification Search
CPC ........................... G09G 3/3258; G09G 3/3291
See application file for complete search history.

(56) References Cited

U.S. PATENT DOCUMENTS 10,891,896 B2 * 1/2021 Wu ...................... G09G 3/3233
11,094,258 B2 * 8/2021 Park ..................... G09G 3/3233
(Continued)

FOREIGN PATENT DOCUMENTS

CN 1744774 A 3/2006
CN 107274830 A 10/2017
(Continued)

OTHER PUBLICATIONS

Lee et al., "Organic light-emitting diode display pixel circuit employing double-gate low-temperature poly-Si thin-film transistor and metal-oxide thin-film transistors," J Society for Information Display, 2020, pp. 1-9.

*Primary Examiner* — Sardis F Azongha
(74) *Attorney, Agent, or Firm* — Muncy, Geissler, Olds & Lowe, P.C.

(57) ABSTRACT

The present disclosure provides a pixel circuit, a pixel driving method and a display device. The pixel circuit includes a first initialization circuit and a compensation circuit; the first initialization circuit is configured to write a first initial voltage into the driving control node under the control of an initial control signal; the compensation circuit is configured to control the driving control node to be connected to the first node under the control of a compensation control signal. The first initialization circuit or the compensation circuit includes an oxide thin film transistor; or, one of the first initialization circuit and the compensation circuit includes a low temperature polysilicon thin film transistor and an oxide transistor connected in series, and the
(Continued)

other of the first initialization circuit and the compensation circuit includes an oxide thin film transistor.

16 Claims, 13 Drawing Sheets

(56) References Cited

U.S. PATENT DOCUMENTS

| | | | | |
|---|---|---|---|---|
| 2006/0055336 | A1 | 3/2006 | Jeong | |
| 2011/0273419 | A1 | 11/2011 | Park et al. | |
| 2015/0154941 | A1* | 6/2015 | Kanda | G09G 5/18 345/76 |
| 2018/0006099 | A1 | 1/2018 | Ka et al. | |
| 2018/0130410 | A1 | 5/2018 | Gao et al. | |
| 2018/0158407 | A1* | 6/2018 | Chai | G09G 3/3233 |
| 2018/0247591 | A1 | 8/2018 | Kim et al. | |
| 2019/0096330 | A1 | 3/2019 | Kim et al. | |
| 2019/0147799 | A1* | 5/2019 | Kim | G09G 3/3266 345/55 |
| 2019/0341431 | A1* | 11/2019 | Lee | G09G 3/3291 |
| 2019/0385523 | A1 | 12/2019 | Na et al. | |

FOREIGN PATENT DOCUMENTS

| | | | |
|---|---|---|---|
| CN | 107564468 | A | 1/2018 |
| CN | 108510944 | A | 9/2018 |
| CN | 109545149 | A | 3/2019 |
| CN | 110619849 | A | 12/2019 |
| CN | 111199709 | A | 5/2020 |
| CN | 111754920 | A | 10/2020 |
| CN | 112365849 | A | 2/2021 |
| CN | 112397030 | A | 2/2021 |
| CN | 112599097 | A | 4/2021 |

* cited by examiner

PIXEL CIRCUIT, PIXEL DRIVING METHOD AND DISPLAY DEVICE

CROSS-REFERENCE TO RELATED APPLICATION

This application is the U.S. national phase of PCT Application No. PCT/CN2021/089952 filed on Apr. 26, 2021, which are incorporated herein by reference in their entities.

TECHNICAL FIELD

The present disclosure relates to the field of display technology, and more particularly to a pixel circuit, a pixel driving method and a display device.

BACKGROUND

Existing low temperature polysilicon (LTPS) display panels utilize the high mobility characteristics of LTPS and are used in display fields that require high switching speeds; however, LTPS thin film transistors (TFTs) have current leakage problems due to their transistor characteristics, and display effect in the low frequency display field is not good.

SUMMARY

A first aspect of the present disclosure provides a pixel circuit including a first initialization circuit and a compensation circuit, wherein the first initialization circuit is electrically connected to an initial control line, a first initial voltage terminal and a driving control node, and is configured to control the first initial voltage terminal to write a first initial voltage into the driving control node under the control of an initial control signal provided by the initial control line; the compensation circuit is electrically connected to a compensation control line, the driving control node and a first node, and is configured to control the driving control node to be connected to the first node under the control of a compensation control signal provided by the compensation control line; the first initialization circuit or the compensation circuit includes an oxide thin film transistor; or one of the first initialization circuit and the compensation circuit includes a low temperature polysilicon thin film transistor and an oxide transistor connected in series, and the other of the first initialization circuit and the compensation circuit includes an oxide thin film transistor.

Optionally, the first initialization circuit comprises a first transistor, and the compensation circuit comprises a second transistor; a control electrode of the first transistor is electrically connected to the initial control line, a first electrode of the first transistor is electrically connected to the first initial voltage terminal, and a second electrode of the first transistor is electrically connected to the driving control node; a control electrode of the second transistor is electrically connected to the compensation control line, a first electrode of the second transistor is electrically connected to the driving control node, and a second electrode of the second transistor is electrically connected to the first node; the first transistor is a low temperature polysilicon thin film transistor, the second transistor is an oxide thin film transistor, the compensation control line is a first scan line in an nth row, and the initial control line is a second scan line in an (n−1)th row, or the second transistor is a low temperature polysilicon thin film transistor, the first transistor is an oxide thin film transistor, the initial control line is a first scan line in the (n−1)th row, and the compensation control line is a second scan line in the nth row; n is a positive integer.

Optionally, when the first transistor is the low temperature polysilicon thin film transistor and the second transistor is the oxide thin film transistor, the first transistor is a dual-gate transistor; when the second transistor is the low temperature polysilicon thin film transistor and the first transistor is the oxide thin film transistor, the second transistor is a double-gate transistor.

Optionally, the first initialization circuit includes a first transistor and a third transistor, and the compensation circuit includes a second transistor; a control electrode of the third transistor is electrically connected to a first scan line in an (n−1)th row, and a first electrode of the third transistor is electrically connected to the first initial voltage terminal; a control electrode of the first transistor is electrically connected to the initial control line, a first electrode of the first transistor is electrically connected to a second electrode of the second transistor, and a second electrode of the first transistor is electrically connected to the driving control node; a control electrode of the second transistor is electrically connected to the compensation control line, a first electrode of the second transistor is electrically connected to the driving control node, and the second electrode of the second transistor is electrically connected to the first node; the initial control line is a second scan line in the (n−1)th row, and the compensation control line is a first scan line in an nth row; n is a positive integer; the first transistor is a low temperature thin film polysilicon transistor, and both the second transistor and the third transistor are oxide thin film transistors.

Optionally, the first initialization circuit includes a first transistor and a third transistor, and the compensation circuit includes a second transistor; a control electrode of the first transistor is electrically connected to the initial control line, and a first electrode of the first transistor is electrically connected to the first initial voltage terminal; a control electrode of the third transistor is electrically connected to a first scan line in an (n−1)th row, a first electrode of the third transistor is electrically connected to a second electrode of the first transistor, and a second electrode of the third transistor is electrically connected to the driving control node; a control electrode of the second transistor is electrically connected to the compensation control line, a first electrode of the second transistor is electrically connected to the driving control node, and a second electrode of the second transistor is electrically connected to the first node; the initial control line is a second scan line in the (n−1)th row, and the compensation control line is a first scan line in an nth row; n is a positive integer; the first transistor is a low temperature thin film polysilicon transistor, and both the second transistor and the third transistor are oxide thin film transistors.

Optionally, the first initialization circuit includes a first transistor, and the compensation circuit includes a second transistor and a fourth transistor; a control electrode of the first transistor is electrically connected to the initial control line, a first electrode of the first transistor is electrically connected to the first initial voltage terminal, and a second electrode of the first transistor is electrically connected to the driving control node; a control electrode of the second transistor is electrically connected to the compensation control line, and a first electrode of the second transistor is electrically connected to the driving control node; a control electrode of the fourth transistor is electrically connected to a first scan line in an nth row, a first electrode of the fourth transistor is electrically connected to the second electrode of the second transistor, and a second electrode of the fourth transistor is electrically connected to the first node; the initial control line is a first scan line in an (n−1)th row, and the compensation control line is a second scan line in the nth row; n is a positive integer; the first transistor and the fourth transistor are oxide thin film transistors, and the second transistor is a low temperature polysilicon thin film transistor.

Optionally, the first initialization circuit includes a first transistor, and the compensation circuit includes a second transistor and a fourth transistor; a control electrode of the first transistor is electrically connected to the initial control line, a first electrode of the first transistor is electrically connected to the first initial voltage terminal, and a second electrode of the first transistor is electrically connected to the driving control node; a control electrode of the fourth transistor is electrically connected to a first scan line in an nth row, and a first electrode of the fourth transistor is electrically connected to the driving control node; a control electrode of the second transistor is electrically connected to the compensation control line, a first electrode of the second transistor is electrically connected to a second electrode of the fourth transistor, and a second electrode of the second transistor is electrically connected to the first node; the initial control line is a first scan line in an (n−1)th row, and the compensation control line is a second scan line in the nth row; n is a positive integer; the first transistor and the fourth transistor are oxide thin film transistors, and the second transistor is a low temperature polysilicon thin film transistor.

Optionally, the pixel circuit further includes a light emitting element, a first light emitting control circuit and a second initialization circuit; the first light emitting control circuit is electrically connected to a light emitting control line, the first node and a first electrode of the light emitting element, and is configured to, under the control of a light emitting control signal provided by the light emitting control line, control the first node to be connected to the first electrode of the light emitting element; the second initialization circuit is electrically connected to a writing-in control line, the first electrode of the light emitting element and a second initial voltage terminal, and is configured to control the second initial voltage terminal to write a second initial voltage into the first electrode of the light emitting element under the control of a writing-in control signal provided by the writing-in control line; a second electrode of the light emitting element is electrically connected to a first voltage terminal.

Optionally, the first light emitting control circuit includes a fifth transistor, and the second initialization circuit includes a sixth transistor; a control electrode of the fifth transistor is electrically connected to the light emitting control line, a first electrode of the fifth transistor is electrically connected to the first node, and a second electrode of the fifth transistor is electrically connected to the first electrode of the light emitting element; a control electrode of the sixth transistor is electrically connected to the writing-in control line, a first electrode of the sixth transistor is electrically connected to the second initial voltage terminal, and a second electrode of the sixth transistor is electrically connected to the first electrode of the light emitting element; both the fifth transistor and the sixth transistor are low temperature polysilicon thin film transistors.

Optionally, the pixel circuit further comprises a driving circuit, a data writing-in circuit, a second light emitting control circuit and an energy storage circuit; a control terminal of the driving circuit is electrically connected to the driving control node, a first terminal of the driving circuit is electrically connected to a second node, and a second terminal of the driving circuit is electrically connected to the first node, and the driving circuit is used to generate a driving current under the control of a potential of the control terminal of the driving circuit; the data writing-in circuit is electrically connected to the writing-in control line, a data line and the second node respectively, and is configured to, under the control of a writing-in control signal provided by the writing-in control line, control to write a data voltage on the data line into the second node; the second light emitting control circuit is electrically connected to the light emitting control line, a second voltage terminal and the second node, and is configured to, under the control of the light emitting control signal provided by the light emitting control line, control the second voltage terminal to be connected to the second node; a first terminal of the energy storage circuit is electrically connected to the second voltage terminal, a second terminal of the energy storage circuit is electrically connected to the driving control node, and the energy storage circuit is configured to store electrical energy.

Optionally, the driving circuit includes a driving transistor, the data writing-in circuit includes a seventh transistor, the second light emitting control circuit includes an eighth transistor, and the energy storage circuit includes a storage capacitor; a control electrode of the driving transistor is electrically connected to the driving control node, a first electrode of the driving transistor is electrically connected to the second node, and a second electrode of the driving transistor is electrically connected to the first node; a control electrode of the seventh transistor is electrically connected to the writing-in control line, a first electrode of the seventh transistor is electrically connected to the data line, and a second electrode of the seventh transistor is electrically connected to the second node; a control electrode of the eighth transistor is electrically connected to the light emitting control line, a first electrode of the eighth transistor is electrically connected to the second voltage terminal, and a second electrode of the eighth transistor is electrically connected to the second node; the energy storage circuit includes a storage capacitor, a first terminal of the storage capacitor is electrically connected to the second voltage terminal, and a second terminal of the energy storage circuit is electrically connected to the driving control node; the driving transistor, the seventh transistor and the eighth transistor are all low temperature polysilicon thin film transistors.

In a second aspect, a pixel driving method is applied to the pixel circuit, a display period includes an initialization phase and a data writing-in phase that are set in sequence; the pixel driving method includes: in the initialization stage, under the control of the initial control signal provided by the initial control line, controlling, by the first initialization circuit, the first initial voltage terminal to write the first initial voltage into the driving control node; in the data writing-in stage, under the control of the compensation control signal provided by the compensation control line, controlling, by the compensation circuit, the driving control node to be connected to the first node.

Optionally, the pixel circuit further includes a light emitting element, a first light emitting control circuit, and a second initialization circuit; the display period further includes a light emitting phase set after the data writing-in phase; the pixel driving method further includes: in the data writing-in phase, under the control of a writing-in control signal, controlling, by the second initialization circuit, the second initial voltage terminal to write a second initial voltage into a first electrode of the light emitting element; in the light emitting phase, under the control of a light emitting control signal provided by the light emitting control line, controlling, by the first light emitting control circuit, the first node to be connected to the first electrode of the light emitting element.

In a third aspect, a display device includes the pixel circuit.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor other than the control electrode, one electrode is called the first electrode, and the other electrode is called the second electrode.

In actual operation, when the transistor is a triode, the control electrode may be the base electrode, the first electrode may be the collector, and the second electrode may be the emitter; or the control electrode may be the base electrode, the first electrode can be an emitter, and the second electrode can be a collector.

In actual operation, when the transistor is a thin film transistor or a field effect transistor, the control electrode may be a gate electrode, the first electrode may be a drain electrode, and the second electrode may be a source electrode. The control electrode may be a gate electrode, the first electrode may be a source electrode, and the second electrode may be a drain electrode.

Figure 1:
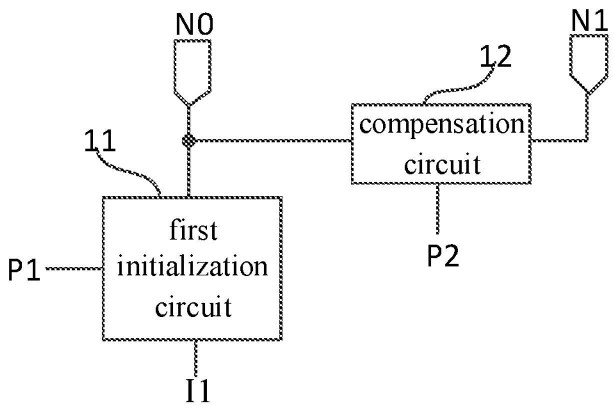
FIG. 1 is a structural diagram of a pixel circuit according to an embodiment of the present disclosure.

As shown in FIG. 1, the pixel circuit described in the embodiment of the present disclosure includes a first initialization circuit 11 and a compensation circuit 12;

The first initialization circuit 11 is electrically connected to an initial control line P1, a first initial voltage terminal I1 and a driving control node N0, and is configured to control the first initial voltage terminal I1 to write a first initial voltage into the driving control node N0 under the control of an initial control signal provided by the initial control line P1;

The compensation circuit 12 is electrically connected to a compensation control line P2, the driving control node N0 and a first node N1 respectively, and is configured to control the driving control node N0 to be connected to the first node N1 under the control of a compensation control signal provided by the compensation control line P2;

The first initialization circuit 11 or the compensation circuit 12 includes an oxide thin film transistor; or, One of the first initialization circuit 11 and the compensation circuit 12 includes a low temperature polysilicon thin film transistor and an oxide transistor connected in series, and the other of the first initialization circuit 11 and the compensation circuit 12 includes an oxide thin film transistor.

The pixel circuit described in the embodiments of the present disclosure can maintain the potential of the driving control node N0, so as to alleviate the phenomenon that the potential of the driving control node cannot be well maintained due to leakage current, thereby affecting the display.

In the embodiment of the present disclosure, one of the first initialization circuit 11 and the compensation circuit 12 includes an oxide thin film transistor, and the other of the first initialization circuit 11 and the compensation circuit 12 may include a low temperature polysilicon thin film transistor, so as to reduce the number of oxide thin film transistors used by the pixel circuit and reduce the layout space occupied by the pixel circuit; or, The first initialization circuit 11 includes a low temperature polysilicon thin film transistor and an oxide thin film transistor connected in series, and the compensation circuit 12 includes an oxide thin film transistor. At this time, an oxide thin film transistor, a low temperature polysilicon thin film transistor included in the first initialization circuit 11 can be electrically connected to the first scan line in the (n−1)th row and the second scan line in the (n−1)th row respectively (n is a positive integer), that is, the scan line electrically connected to the previous row of pixel circuits can be shared without adding an additional signal line, the layout space can be saved; or, The compensation circuit 12 includes a low temperature polysilicon thin film transistor and an oxide thin film transistor connected in series, and the first initialization circuit 11 includes an oxide thin film transistor; at this time, an oxide thin film transistor, a low temperature polysilicon thin film transistor included in the compensation circuit 12 can be electrically connected to the first scan line in the nth row and the second scan line in the nth row respectively (n is a positive integer), without adding an additional signal line, which can save layout space.

In a specific implementation, when n is equal to 1, the first scan line in the (n−1)th row and the second scan line in the (n−1)th row may be additional signal lines for providing the scanning signal for the first row of pixel circuits of the display device.

During operation of the pixel circuit shown in FIG. 1 of at least one embodiment of the present disclosure, the display period includes an initialization phase and a data writing-in phase that are set in sequence;

In the initialization phase, the first initialization circuit 11 controls the first initial voltage terminal I1 to write the first initial voltage into the driving control node N0 under the control of the initial control signal provided by the initial control line P1;

In the data writing-in phase, the compensation circuit 12 controls the driving control node N0 to be connected to the first node N1 under the control of the compensation control signal provided by the compensation control line P2.

Optionally, the first initialization circuit includes a first transistor, and the compensation circuit includes a second transistor;

A control electrode of the first transistor is electrically connected to the initial control line, a first electrode of the first transistor is electrically connected to the first initial voltage terminal, and a second electrode of the first transistor is electrically connected to the driving control node;

A control electrode of the second transistor is electrically connected to the compensation control line, a first electrode of the second transistor is electrically connected to the driving control node, and a second electrode of the second transistor is electrically connected to the first node;

The first transistor is a low temperature polysilicon thin film transistor, the second transistor is an oxide thin film transistor, the compensation control line is the first scan line in the nth row, and the initial control line is the second scan line in the (n−1)th row, or the second transistor is a low temperature polysilicon thin film transistor, the first transistor is an oxide thin film transistor, the initial control line is the first scan line in the (n−1)th row, and the compensation control line is the second scan line in the nth row; n is a positive integer.

In at least one embodiment of the present disclosure, when the first transistor is a low temperature polysilicon thin film transistor and the second transistor is an oxide thin film transistor, the first transistor is a double-gate transistor, and the double-gate transistor can reduce current leakage of the driving control node, and because the first transistor is a low temperature polysilicon thin film transistor, the initialization speed of the driving control node is faster in the initialization phase;

When the second transistor is a low temperature polysilicon thin film transistor and the first transistor is an oxide thin film transistor, the second transistor is a double-gate transistor, and the double-gate transistor can reduce the current leakage of the driving control node, and since the second transistor is a low temperature polysilicon thin film transistor, the charging speed is faster in the data writing-in phase, and the picture quality can be improved.

Optionally, the first initialization circuit includes a first transistor and a third transistor, and the compensation circuit includes a second transistor;

A control electrode of the third transistor is electrically connected to the first scan line in the (n−1)th row, and a first electrode of the third transistor is electrically connected to the first initial voltage terminal;

A control electrode of the first transistor is electrically connected to the initial control line, a first electrode of the first transistor is electrically connected to a second electrode of the second transistor, and the second electrode of the first transistor is electrically connected to the driving control node;

A control electrode of the second transistor is electrically connected to the compensation control line, a first electrode of the second transistor is electrically connected to the driving control node, and a second electrode of the second transistor is electrically connected to the first node;

The initial control line is the second scan line in the (n−1)th row, and the compensation control line is the first scan line in the nth row; n is a positive integer;

The first transistor is a low temperature thin film polysilicon transistor, and both the second transistor and the third transistor are oxide thin film transistors.

In at least one embodiment of the present disclosure, the first transistor in the first initialization circuit may be a low temperature polysilicon transistor, and the second transistor in the first initialization circuit may be an oxide transistor. On the current leakage path from the driving control node to the first initial voltage terminal, one transistor is added to further prevent current leakage;

In addition, a control electrode of the third transistor is electrically connected to the first scan line in the (n−1)th row, and the control electrode of the first transistor is electrically connected to the second scan line in the (n−1)th row, so as to share the scan line with the previous row of pixel units, so there is no need to add additional signal lines, which saves layout space.

Optionally, the first initialization circuit includes a first transistor and a third transistor, and the compensation circuit includes a second transistor;

A control electrode of the first transistor is electrically connected to the initial control line, and a first electrode of the first transistor is electrically connected to the first initial voltage terminal;

A control electrode of the third transistor is electrically connected to the first scan line in the (n−1)th row, a first electrode of the third transistor is electrically connected to the second electrode of the first transistor, and a second electrode of the third transistor is electrically connected to the driving control node;

A control electrode of the second transistor is electrically connected to the compensation control line, a first electrode of the second transistor is electrically connected to the driving control node, and a second electrode of the second transistor is electrically connected to the first node;

The initial control line is the second scan line in the (n−1)th row, and the compensation control line is the first scan line in the nth row; n is a positive integer;

The first transistor is a low temperature thin film polysilicon transistor, and both the second transistor and the third transistor are oxide thin film transistors.

In at least one embodiment of the present disclosure, the first initialization circuit includes a first transistor, and the compensation circuit includes a second transistor and a fourth transistor;

A control electrode of the first transistor is electrically connected to the initial control line, a first electrode of the first transistor is electrically connected to the first initial voltage terminal, and a second electrode of the first transistor is electrically connected to the driving control node;

A control electrode of the second transistor is electrically connected to the compensation control line, and a first electrode of the second transistor is electrically connected to the driving control node;

A control electrode of the fourth transistor is electrically connected to the first scan line in the nth row, a first electrode of the fourth transistor is electrically connected to the second electrode of the second transistor, and a second electrode of the fourth transistor is electrically connected to the first node;

The initial control line is the first scan line in the (n−1)th row, and the compensation control line is the second scan line in the nth row; n is a positive integer;

The first transistor and the fourth transistor are oxide thin film transistors, and the second transistor is a low temperature polysilicon thin film transistor.

In a specific implementation, the second transistor in the compensation circuit may be a low temperature polysilicon transistor, and the fourth transistor in the compensation circuit may be an oxide transistor. On the current leakage path from the driving control node to the first node, one transistor is added to further prevent current leakage;

In addition, a control electrode of the fourth transistor is electrically connected to the first scan line in the nth row, and a control electrode of the second transistor is electrically connected to the second scan line in the nth row, so there is no need to add an additional signal line, which can save the layout space.

In at least one embodiment of the present disclosure, the first initialization circuit includes a first transistor, and the compensation circuit includes a second transistor and a fourth transistor;

A control electrode of the first transistor is electrically connected to the initial control line, a first electrode of the first transistor is electrically connected to the first initial voltage terminal, and a second electrode of the first transistor is electrically connected to the driving control node;

A control electrode of the fourth transistor is electrically connected to the first scan line in the nth row, and a first electrode of the fourth transistor is electrically connected to the driving control node;

A control electrode of the second transistor is electrically connected to the compensation control line, a first electrode of the second transistor is electrically connected to the second electrode of the fourth transistor, and a second electrode of the second transistor is electrically connected to the first node;

The initial control line is the first scan line in the (n−1)th row, and the compensation control line is the second scan line in the nth row; n is a positive integer;

The first transistor and the fourth transistor are oxide thin film transistors, and the second transistor is a low temperature polysilicon thin film transistor.

Figure 2:
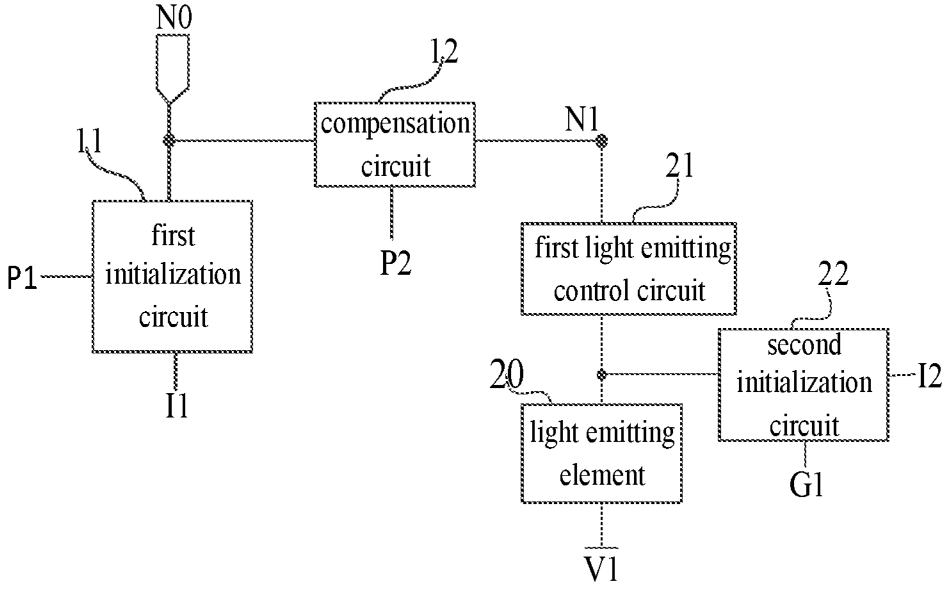
FIG. 2 is a structural diagram of a pixel circuit according to at least one embodiment of the present disclosure.

As shown in FIG. 2, on the basis of the embodiment of the pixel circuit shown in FIG. 1, the pixel circuit according to at least one embodiment of the present disclosure further includes a light emitting element 20, a first light emitting control circuit 21 and a second initialization circuit 22;

The first light emitting control circuit 21 is respectively electrically connected to a light emitting control line E1, the first node N1 and a first electrode of the light emitting element 20, and is used for, under the control of the light emitting control signal provided by the light emitting control line E1, controlling the first node N1 to be connected to the first electrode of the light emitting element 20;

The second initialization circuit 22 is respectively electrically connected to a writing-in control line G1, the first electrode of the light emitting element 20 is electrically connected to the second initial voltage terminal I2, and is configured to control the second initial voltage terminal I2 to write the second initial voltage into the first electrode of the light emitting element 20 under the control of the writing-in control signal provided by the writing-in control line G1;

The second electrode of the light emitting element 20 is electrically connected to the first voltage terminal V1.

In at least one embodiment of the present disclosure, the light emitting element 20 may be an organic light emitting diode, the first electrode of the light emitting element 20 may be an anode of the organic light emitting diode, and the second electrode of the light emitting element 20 may be a cathode of the organic light emitting diode.

Optionally, the first voltage terminal V1 may be a low voltage terminal or a ground terminal.

In at least one embodiment of the present disclosure, the writing-in control line may be the second scan line in the nth row.

Optionally, the first light emitting control circuit includes a fifth transistor, and the second initialization circuit includes a sixth transistor;

A control electrode of the fifth transistor is electrically connected to the light emitting control line, a first electrode of the fifth transistor is electrically connected to the first node, and a second electrode of the fifth transistor is electrically connected to the first electrode of the light emitting element.

A control electrode of the sixth transistor is electrically connected to the writing-in control line, a first electrode of the sixth transistor is electrically connected to the second initial voltage terminal, and a second electrode of the sixth transistor is electrically connected to the first electrode of the light emitting element;

Both the fifth transistor and the sixth transistor are low temperature polysilicon thin film transistors.

Figure 3:
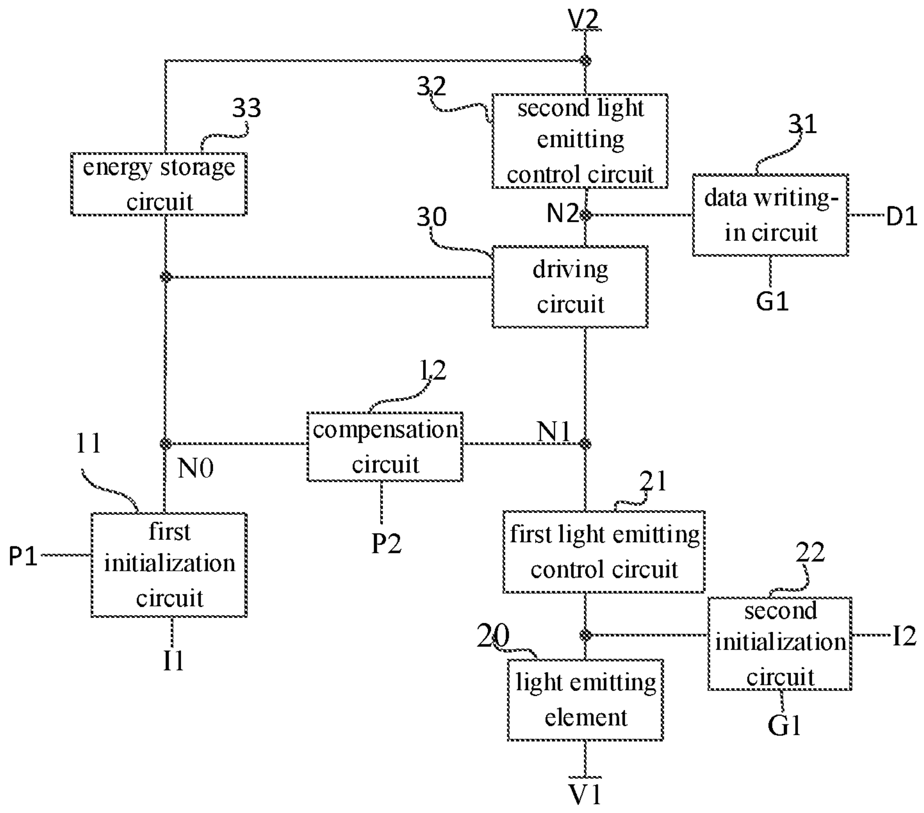
FIG. 3 is a structural diagram of a pixel circuit according to at least one embodiment of the present disclosure.

As shown in FIG. 3, on the basis of at least one embodiment of the pixel circuit shown in FIG. 2, the pixel circuit according to at least one embodiment of the present disclosure further includes a driving circuit 30, a data writing-in circuit 31, a second light emitting control circuit 32 and an energy storage circuit 33;

The control terminal of the driving circuit 30 is electrically connected to the driving control node N0, the first terminal of the driving circuit 30 is electrically connected to the second node N2, and the second terminal of the driving circuit 30 is electrically connected to the first node N1, and the driving circuit 30 is used to generate a driving current under the control of the potential of the control terminal of the driving circuit 30;

The data writing-in circuit 31 is electrically connected to the writing-in control line G1, the data line D1 and the second node N2 respectively, and is used to, under the control of the writing-in control signal provided by the writing-in control line G1, control to write the data voltage on the data line D1 into the second node N2;

The second light emitting control circuit 32 is respectively electrically connected to the light emitting control line E1, the second voltage terminal V2 and the second node N2, and is used to, under the control of the light emitting control signal provided by the light emitting control line E1, control the second voltage terminal V2 to be connected to the second node N2;

The first terminal of the energy storage circuit 33 is electrically connected to the second voltage terminal V2, the second terminal of the energy storage circuit 33 is electrically connected to the driving control node N0, and the energy storage circuit 33 is used for storing electrical energy.

During operation of the pixel circuit shown in FIG. 3 of the present disclosure, the display period includes an initialization phase, a data writing-in phase, and a light emitting phase that are set in sequence;

In the initialization phase, the first initialization circuit 11 controls the first initial voltage terminal I1 to write the first initial voltage into the driving control node N0 under the control of the initial control signal provided by the initial control line P1;

In the data writing-in phase, under the control of the compensation control signal provided by the compensation control line P2, the compensation circuit 12 controls the driving control node N0 to be connected to the first node N1 to adjust the threshold voltage of the driving transistor in the driving circuit; under the control of the writing-in control signal provided by the writing-in control line G1, the data writing-in circuit 31 controls to write the data voltage on the data line D1 into the second node N2; under the control of the writing-in control signal provided by the writing-in control line G1, the second initialization circuit 22 controls the second initial voltage terminal I2 to write the second initial voltage into the first electrode of the light emitting element 20 to clear the residual charge of the first electrode of the light emitting element 20 and make the light emitting element 20 not emit light;

In the light emitting phase, the first light emitting control circuit 21 controls the first node N1 to be connected to the first electrode of the light emitting element 20 under the control of the light emitting control signal provided by the light emitting control line E1; the second light emitting control circuit 32 controls the second voltage terminal V2 to be connected to the second node N2 under the control of the light emitting control signal provided by the light emitting control line E1; the driving circuit 30 drives the light emitting element 20 to emit light.

Optionally, the driving circuit includes a driving transistor, the data writing-in circuit includes a seventh transistor, the second light emitting control circuit includes an eighth transistor, and the energy storage circuit includes a storage capacitor;

A control electrode of the driving transistor is electrically connected to the driving control node, a first electrode of the driving transistor is electrically connected to the second node, and a second electrode of the driving transistor is electrically connected to the first node;

A control electrode of the seventh transistor is electrically connected to the writing-in control line, a first electrode of the seventh transistor is electrically connected to the data line, and a second electrode of the seventh transistor is electrically connected to the second node;

A control electrode of the eighth transistor is electrically connected to the light emitting control line, a first electrode of the eighth transistor is electrically connected to the second voltage terminal, and a second electrode of the eighth transistor is electrically connected to the second node;

The energy storage circuit includes a storage capacitor, a first terminal of the storage capacitor is electrically connected to the second voltage terminal, and a second terminal of the energy storage circuit is electrically connected to the driving control node;

The driving transistor, the seventh transistor and the eighth transistor are all low temperature polysilicon thin film transistors.

Figure 4:
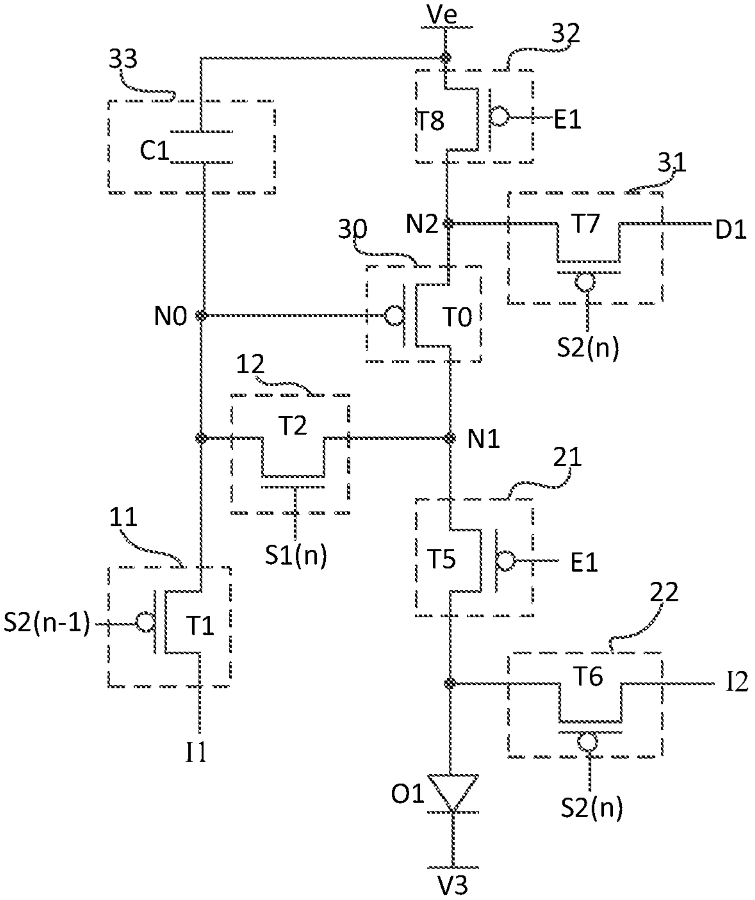
FIG. 4 is a circuit diagram of a pixel circuit according to at least one embodiment of the present disclosure.

As shown in FIG. 4, on the basis of the pixel circuit shown in FIG. 3, the first initialization circuit 11 includes a first transistor T1, and the compensation circuit 12 includes a second transistor T2; the first light emitting control circuit 21 includes a fifth transistor T5, the second initialization circuit 22 includes a sixth transistor T6; the driving circuit 30 includes a drive transistor T0, the data writing-in circuit 31 includes a seventh transistor T7, the second light emitting control circuit 32 includes an eighth transistor T8, the energy storage circuit 33 includes a storage capacitor C1; the light emitting element is an organic light emitting diode O1;

The gate electrode of T1 is electrically connected to the second scan line S2($n$−1) in the (n−1)th row, the source electrode of T1 is electrically connected to the first initial voltage terminal I1, and the drain electrode of T1 is electrically connected to the driving control node N0;

The gate electrode of T2 is electrically connected to the first scan line S1($n$) in the nth row, the source electrode of T2 is electrically connected to the driving control node N0, and the drain electrode of T2 is electrically connected to the first node N1;

The gate electrode of T5 is electrically connected to the light emitting control line E1, the source electrode of T5 is electrically connected to the first node N1, the drain electrode of T5 is electrically connected to the anode of O1; the cathode of O1 is electrically connected to the low voltage terminal V3;

The gate electrode of T6 is electrically connected to the second scan line S2($n$) in the nth row, the source electrode of T6 is electrically connected to the second initial voltage terminal I2, and the drain electrode of T6 is electrically connected to the drain electrode of T5;

The gate electrode of T0 is electrically connected to the driving control node N0, the source electrode of T0 is electrically connected to the second node N2, and the drain electrode of T0 is electrically connected to the first node N1;

The gate electrode of T7 is electrically connected to the second scan line S2($n$) in the nth row, the source electrode of T7 is electrically connected to the data line D1, and the drain electrode of T7 is electrically connected to the second node N2;

The gate electrode of T8 is electrically connected to the light emitting control line E1, the source electrode of T8 is electrically connected to the power supply voltage terminal Ve, and the drain electrode of T8 is electrically connected to the second node N2;

The first terminal of C1 is electrically connected to the power supply voltage terminal Ve, and the second terminal of C1 is electrically connected to the driving control node N0.

In at least one embodiment of the pixel circuit shown in FIG. 4, T2 is an n-type transistor, T1, T5, T6, T7, T8 and T0 are all p-type transistors; T2 is an oxide thin film transistor, T1, T5, T6, T7, T8 and T0 are all low temperature polysilicon thin film transistors; the first voltage terminal is the low voltage terminal V3, and the second voltage terminal is the power supply voltage terminal Ve; but they are not limited thereto.

In at least one embodiment of the pixel circuit shown in FIG. 4, the first transistor T1 included in the first initialization circuit 11 is a low temperature polysilicon thin film transistor, so as to reduce the number of oxide thin film transistors used in the pixel circuit and save layout space;

In addition, since the response speed of the low temperature polysilicon thin film transistor is relatively fast, the initializing speed of T1 in the first initialization circuit 11 for driving the potential of the control node N0 is relatively fast.

In at least one embodiment of the pixel circuit shown in FIG. 4, T1 can be a double-gate transistor, which can reduce the risk that the current leakage of the driving control node N0 is reduced, so that the potential of N0 cannot be maintained to affect the display.

In at least one embodiment of the pixel circuit shown in FIG. 4,

Since the first current leakage path from N0 to I1 only includes one low temperature polysilicon thin film transistor, it is necessary to reduce the current leakage of the current leakage path from N0 to I1, and the voltage value of the first initial voltage can be set to a voltage greater than the second initial voltage. For example, the voltage value of the first initial voltage may be about −2.2V (in at least one embodiment of the present disclosure, "about −2.2V" may refer to greater than or equal to −2.3V and less than or equal to −2.1 V, but not limited thereto), the voltage value of the second initial voltage may be about −2.5V (in at least one embodiment of the present disclosure, "about −2.5V" may refer to greater than or equal to −2.6V and less than or equal to −2.4V, but not limited to);

When the pixel circuit is in the high-brightness display mode, since the voltage value of the low-voltage signal provided by the low-voltage terminal V3 is correspondingly reduced to achieve high brightness, the voltage value of the second initial voltage can also be correspondingly reduced (at this time the voltage value of the second initial voltage may be related to the voltage value of the low voltage signal provided by V3), and the voltage value of the first initial voltage may be greater than the voltage value of the second initial voltage to reduce or minimize the current leakage of N0 to I1;

When the pixel circuit is in the low-brightness display mode, since the voltage value of the low-voltage signal provided by the low-voltage terminal V3 is correspondingly increased to achieve low brightness, the voltage value of the second initial voltage can also be correspondingly increased (the voltage value of the second initial voltage may be related to the voltage value of the low voltage signal provided by V3), and the voltage value of the second initial voltage may be greater than the voltage value of the first initial voltage, the current leakage from the driving control node to the second initial voltage terminal is decreased accordingly.

Figure 5:
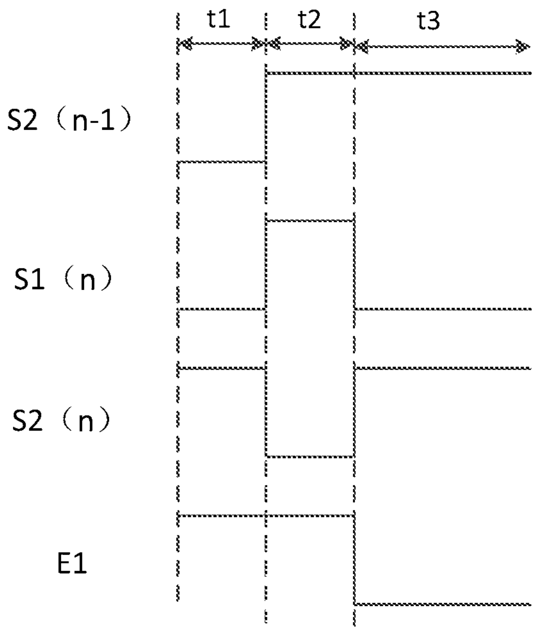
FIG. 5 is a working timing diagram of the pixel circuit as shown in FIG. 4 according to at least one embodiment of the present disclosure.

As shown in FIG. 5, during operation of at least one embodiment of the pixel circuit shown in FIG. 4 of the present disclosure, the display period includes an initialization phase t2, a data writing-in phase t2 and a light emitting phase t3 that are set in sequence;

In the initialization phase t1, S2(*n*−1) provides a low voltage signal, S1(*n*) provides a low voltage signal, S2(*n*) provides a high voltage signal, E1 provides a high voltage signal, T2, T5, T6, T7 and T8 are all turned off; T1 is turned on to write the first initial voltage to the driving control node N0, so that T0 can be turned on when the data writing-in phase starts;

In the data writing-in phase t2, S2(*n*−1) provides a high voltage signal, S1(*n*) provides a high voltage signal, S2(*n*) provides a low voltage signal, E1 provides a high voltage signal, T1 is turned off, T2 is turned on, and T6 and T7 are turned on, the data line D1 writes the data voltage Vd into the second node N2, and I2 writes the second initial voltage into the anode of O1 to clear the residual charge of the anode of O1 and control O1 not to emit light;

At the beginning of the data writing-in phase t2, T0 is turned on to charge C1 through Vd to raise the potential of N0 until T0 is turned off, and the potential of N0 becomes Vd+Vth, where Vth is the threshold voltage of T0, so that the threshold voltage is compensated;

In the light emitting phase t3, S2(*n*−1) provides a high voltage signal, S1(*n*) provides a low voltage signal, S2(*n*) provides a high voltage signal, E1 provides a low voltage signal, and T1, T2, T6 and T7 are all turned off, T5 and T8 are both turned on, T0 drives O1 to emit light, and the driving current for T0 to drive O1 is not related to Vth.

Figure 6:
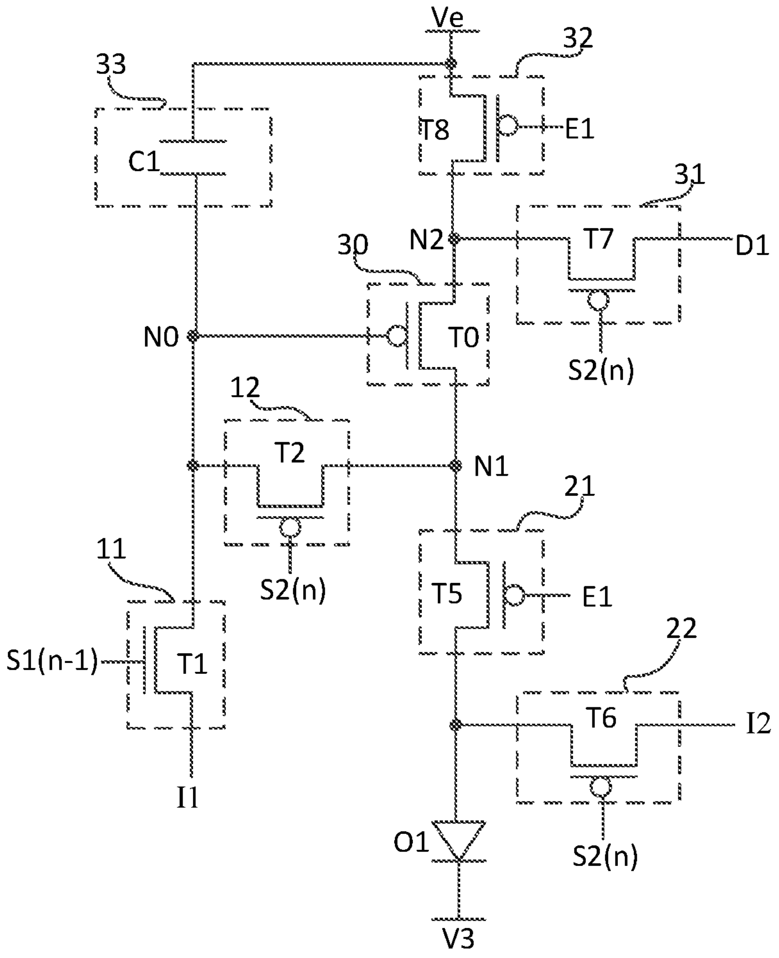
FIG. 6 is a circuit diagram of a pixel circuit according to at least one embodiment of the present disclosure.

As shown in FIG. 6, on the basis of the embodiment of the pixel circuit shown in FIG. 3, the first initialization circuit 11 includes a first transistor T1, and the compensation circuit 12 includes a second transistor T2; the first light emitting control circuit 21 includes a fifth transistor T5, the second initialization circuit 22 includes a sixth transistor T6; the driving circuit 30 includes a drive transistor T0, the data writing-in circuit 31 includes a seventh transistor T7, the second light emitting control circuit 32 includes an eighth transistor T8, the energy storage circuit 33 includes a storage capacitor C1; the light emitting element is an organic light emitting diode O1;

The gate electrode of T1 is electrically connected to the first scan line S1 (n−1) in the (n−1)th row, the source electrode of T1 is electrically connected to the first initial voltage terminal I1, and the drain electrode of T1 is electrically connected to the driving control node N0;

The gate electrode of T2 is electrically connected to the second scan line S2(*n*) in the nth row, the source electrode of T2 is electrically connected to the driving control node N0, and the drain electrode of T2 is electrically connected to the first node N1;

The gate electrode of T5 is electrically connected to the light emitting control line E1, the source electrode of T5 is electrically connected to the first node N1, the drain electrode of T5 is electrically connected to the anode of O1; the cathode of O1 is electrically connected to the low voltage terminal V3;

The gate electrode of T6 is electrically connected to the second scan line S2(*n*) in the nth row, the source electrode of T6 is electrically connected to the second initial voltage terminal I2, and the drain electrode of T6 is electrically connected to the drain electrode of T5;

The gate electrode of T0 is electrically connected to the driving control node N0, the source electrode of T0 is electrically connected to the second node N2, and the drain electrode of T0 is electrically connected to the first node N1;

The gate electrode of T7 is electrically connected to the second scan line S2(*n*) in the nth row, the source electrode of T7 is electrically connected to the data line D1, and the drain electrode of T7 is electrically connected to the second node N2;

The gate electrode of T8 is electrically connected to the light emitting control line E1, the source electrode of T8 is electrically connected to the power supply voltage terminal Ve, and the drain electrode of T8 is electrically connected to the second node N2;

The first terminal of C1 is electrically connected to the power supply voltage terminal Ve, and the second terminal of C1 is electrically connected to the driving control node N0.

In at least one embodiment of the pixel circuit shown in FIG. 6, T1 is an n-type transistor, T2, T5, T6, T7, T8 and T0 are all p-type transistors; T1 is an oxide thin film transistor, and T2, T5, T6, T7, T8 and T0 are all low temperature polysilicon thin film transistors; the first voltage terminal is the low voltage terminal V3, and the second voltage terminal is the power supply voltage terminal Ve; but not limited thereto.

In at least one embodiment of the pixel circuit shown in FIG. 6, the second transistor T2 included in the compensation circuit 12 is a low temperature polysilicon thin film transistor, so that the number of oxide thin film transistors used in the pixel circuit can be reduced, the layout space may be saved;

In addition, since the response speed of the low temperature polysilicon thin film transistor is relatively fast, in the data writing-in stage, the charging speed of C1 is relatively fast, which is beneficial to improve the picture quality.

In at least one embodiment of the pixel circuit shown in FIG. 6, T2 can be a double-gate transistor, which can reduce the risk of affecting the display because the potential of N0 cannot be maintained due to the current leakage of the driving control node N0.

In at least one embodiment of the pixel circuit shown in FIGS. 6, T2, T5 and T6 are all low temperature polysilicon thin film transistors. In order to prevent current leakage through the current leakage path from N0 to I2, the voltage value of the second initial voltage provided by I2 can be increased. For example, the voltage value of the first initial voltage provided by I1 may be about −2.5V, and the voltage value of the first initial voltage provided by I2 may be about −2.2V, but not limited thereto.

Figure 7:
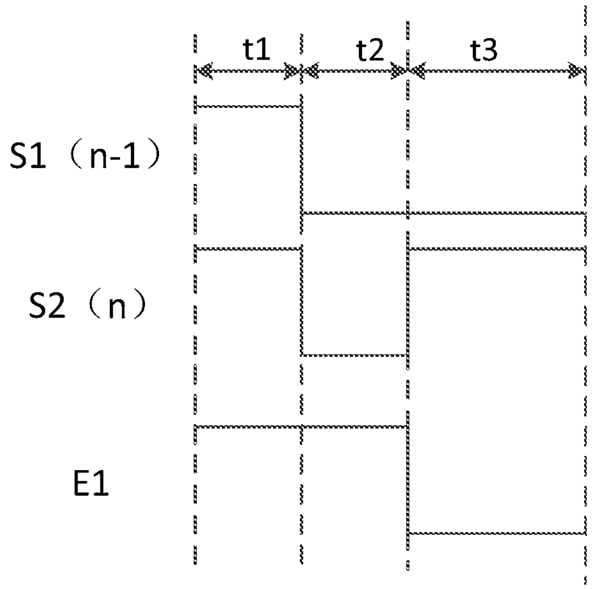
FIG. 7 is a working timing diagram of the pixel circuit as shown in FIG. 6 according to at least one embodiment of the present disclosure.

As shown in FIG. 7, during operation of at least one embodiment of the pixel circuit shown in FIG. 6 of the present disclosure, the display period includes an initialization phase t1, a data writing-in phase t2 and a light emitting phase t3 which are set in sequence;

In the initialization phase t1, S1($n$−1) provides a high voltage signal, S2($n$) provides a high voltage signal, E1 provides a high voltage signal, T2, T5, T6, T7 and T8 are all turned off; T1 is turned on to write the first initial voltage into the driving control node N0, so that T0 can be turned on when the data writing-in phase begins;

In the data writing-in phase t2, S1($n$−1) provides a low voltage signal, S2($n$) provides a low voltage signal, E1 provides a high voltage signal, T1 is turned off, T2 is turned on, T6 and T7 are turned on, and the data line D1 writes the data voltage Vd into the second node N2, and I2 writes a second initial voltage into the anode of O1 to clear the residual charge of the anode of O1 and control O1 not to emit light;

At the beginning of the data writing-in phase t2, T0 is turned on to charge C1 through Vd to raise the potential of N0 until T0 is turned off, and the potential of N0 becomes Vd+Vth, where Vth is the threshold voltage of T0, so that the threshold voltage is compensated;

In the light emitting phase t3, S1($n$−1) provides a low voltage signal, S2($n$) provides a high voltage signal, E1 provides a low voltage signal, T1, T2, T6 and T7 are all turned off, T5 and T8 are all turned on, and T0 drives O1 to emit light, and the driving current for T0 to drive O1 is not related to Vth.

Figure 8:
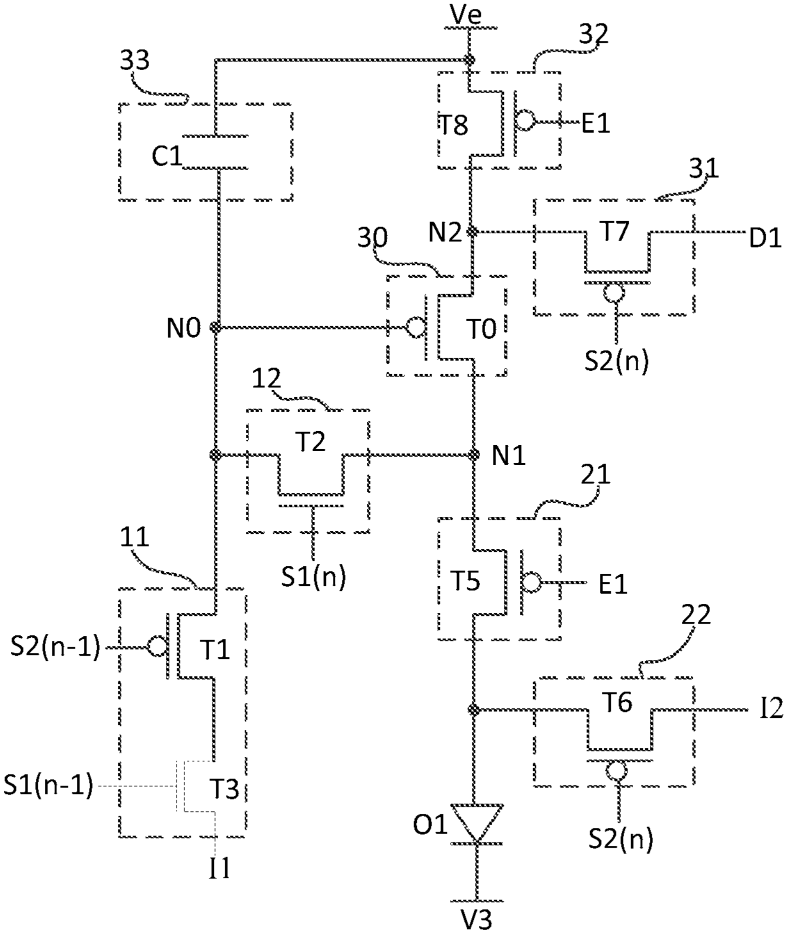
FIG. 8 is a circuit diagram of a pixel circuit according to at least one embodiment of the present disclosure.

As shown in FIG. 8, on the basis of the embodiment of the pixel circuit shown in FIG. 3, the first initialization circuit 11 includes a first transistor T1 and a third transistor T3, and the compensation circuit 12 includes a second transistor T2; the first light emitting control circuit 21 includes a fifth transistor T5, the second initialization circuit 22 includes a sixth transistor T6; the driving circuit 30 includes a driving transistor T0, the data writing-in circuit 31 includes a seventh transistor T7, the second light emitting control circuit 32 includes an eighth transistor T8, the energy storage circuit 33 includes a storage capacitor C1; the light emitting element is an organic light emitting diode O1;

The gate electrode of T3 is electrically connected to the first scan line S1 (n−1) in the (n−1)th row, and the source electrode of T3 is electrically connected to the first initial voltage terminal I1;

The gate electrode of T1 is electrically connected to the second scan line S2($n$−1) in the (n−1)th row, the source electrode of T1 is electrically connected to the drain electrode of T3, and the drain electrode of T1 is electrically connected to the driving control node;

The gate electrode of T2 is electrically connected to the first scan line S1($n$) in the nth row, the source electrode of T2 is electrically connected to the driving control node N0, and the drain electrode of T2 is electrically connected to the first node N1;

The gate electrode of T5 is electrically connected to the light emitting control line E1, the source electrode of T5 is electrically connected to the first node N1, the drain electrode of T5 is electrically connected to the anode of O1; the cathode of O1 is electrically connected to the low voltage terminal V3;

The gate electrode of T6 is electrically connected to the second scan line S2($n$) in the nth row, the source electrode of T6 is electrically connected to the second initial voltage terminal I2, and the drain electrode of T6 is electrically connected to the drain electrode of T5;

The gate electrode of T0 is electrically connected to the driving control node N0, the source electrode of T0 is electrically connected to the second node N2, and the drain electrode of T0 is electrically connected to the first node N1;

The gate electrode of T7 is electrically connected to the second scan line S2($n$) in the nth row, the source electrode of T7 is electrically connected to the data line D1, and the drain electrode of T7 is electrically connected to the second node N2;

The gate electrode of T8 is electrically connected to the light emitting control line E1, the source electrode of T8 is electrically connected to the power supply voltage terminal Ve, and the drain electrode of T8 is electrically connected to the second node N2;

The first terminal of C1 is electrically connected to the power supply voltage terminal Ve, and the second terminal of C1 is electrically connected to the driving control node N0.

In at least one embodiment of the pixel circuit shown in FIGS. 8, T2 and T3 are n-type transistors, T1, T5, T6, T7, T8 and T0 are all p-type transistors; T2 and T3 are oxide thin film transistors, and T1, T5, T6, T7, T8 and T0 are all low temperature polysilicon thin film transistors; the first voltage terminal is the low voltage terminal V3, and the second voltage terminal is the power supply voltage terminal Ve; but not limited thereto.

In at least one embodiment of the pixel circuit shown in FIG. 8, there are two current leakage paths to the driving control node N0: a first current leakage path from N0 to I1, and a first current leakage path from N0 to I2;

In the first current leakage path from N0 to I1, there are two transistors, and oxide thin film transistors are included to be able to effectively prevent current leakage; and, in the second current leakage path from N0 to I2, there are three transistors, and oxide thin film transistors are included to effectively prevent from the current leakage;

In addition, the gate electrode of T1 is electrically connected to the second scan line S2($n$−1) in the (n−1)th row, and the gate electrode of T2 is electrically connected to the first scan line S1($n$−1) of the (n−1)th row, so it is not necessary to add a signal line, and the scan line can be shared with the previous row of pixel circuits, which can save layout space (the pixel circuit shown in FIG. 8 can be the nth row of pixel circuits included in the display device, and n is positive integer).

In at least one embodiment of the pixel circuit shown in FIG. 8,

The first initial voltage provided by I1 may be greater than the second initial voltage provided by I2. Since there are two transistors in the first current leakage path and three transistors in the second current leakage path, the first initial voltage may be greater than the second initial voltage (for example, the voltage value of the first initial voltage may be about −2.2V, and the voltage value of the second initial voltage may be about −2.5V), so that the voltage difference between the driving control node N0 and the first initial voltage terminal I1 is small, and the current leakage phenomenon is improved;

When the pixel circuit is in the high-brightness display mode, since the voltage value of the low-voltage signal provided by the low-voltage terminal V3 is correspondingly reduced to achieve high brightness, the voltage value of the second initial voltage can also be correspondingly reduced (at this time the voltage value of the second initial voltage may be related to the voltage value of the low voltage signal provided by V3), and the voltage value of the first initial voltage may be greater than the voltage value of the second initial voltage to reduce or minimize the current leakage from N0 to I1;

When the pixel circuit is in the low-brightness display mode, since the voltage value of the low-voltage signal provided by the low-voltage terminal V3 is correspondingly increased to achieve low brightness, the voltage value of the second initial voltage can also be correspondingly increased (the voltage value of the second initial voltage may be related to the voltage value of the low voltage signal provided by V3), and the voltage value of the second initial voltage may be greater than the voltage value of the first initial voltage, the leakage current from the driving control node to the second initial voltage terminal is decreased accordingly.

Figure 9:
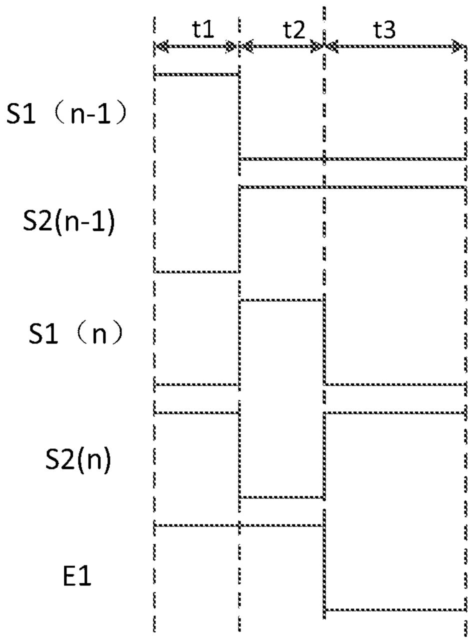
FIG. 9 is a working timing diagram of the pixel circuit as shown in FIG. 8 according to at least one embodiment of the present disclosure.

As shown in FIG. 9, during operation of at least one embodiment of the pixel circuit shown in FIG. 8 of the present disclosure, the display period includes an initialization phase t1, a data writing-in phase t2 and a light emitting phase t3 which are set in sequence;

In the initialization phase t1, S1(*n*−1) provides a high voltage signal, S2(*n*−1) provides a low voltage signal, S1(*n*) provides a low voltage signal, S2(*n*) provides a high voltage signal, and E1 provides a high voltage signal, T2, T5, T6, T7 and T8 are all turned off; T1 and T3 are turned on to write the first initial voltage into the driving control node N0, so that T0 can be turned on when the data writing-in phase begins;

In the data writing-in phase t2, S1(*n*−1) provides a low voltage signal, S2(*n*−1) provides a high voltage signal, S1(*n*) provides a high voltage signal, S2(*n*) provides a low voltage signal, and E1 provides a high voltage signal, T1 and T3 are turned off, T2 is turned on, T6 and T7 are turned on, the data line D1 writes the data voltage Vd into the second node N2, and I2 writes the second initial voltage into the anode of O1 to clear the residual charge of the anode of O1 and control O1 not to emit light;

At the beginning of the data writing-in phase t2, T0 is turned on to charge C1 through Vd to raise the potential of N0 until T0 is turned off, and the potential of N0 becomes Vd+Vth, where Vth is the threshold voltage of T0, so that the threshold voltage is compensated;

In the light emitting phase t3, S1(*n*−1) provides a low voltage signal, S2(*n*−1) provides a high voltage signal, S1(*n*) provides a low voltage signal, S2(*n*) provides a high voltage signal, and E1 provides a low voltage signal, T1, T3, T2, T6 and T7 are all turned off, T5 and T8 are all turned on, T0 drives O1 to emit light, and the driving current for T0 to drive O1 is not related to Vth.

Figure 10:
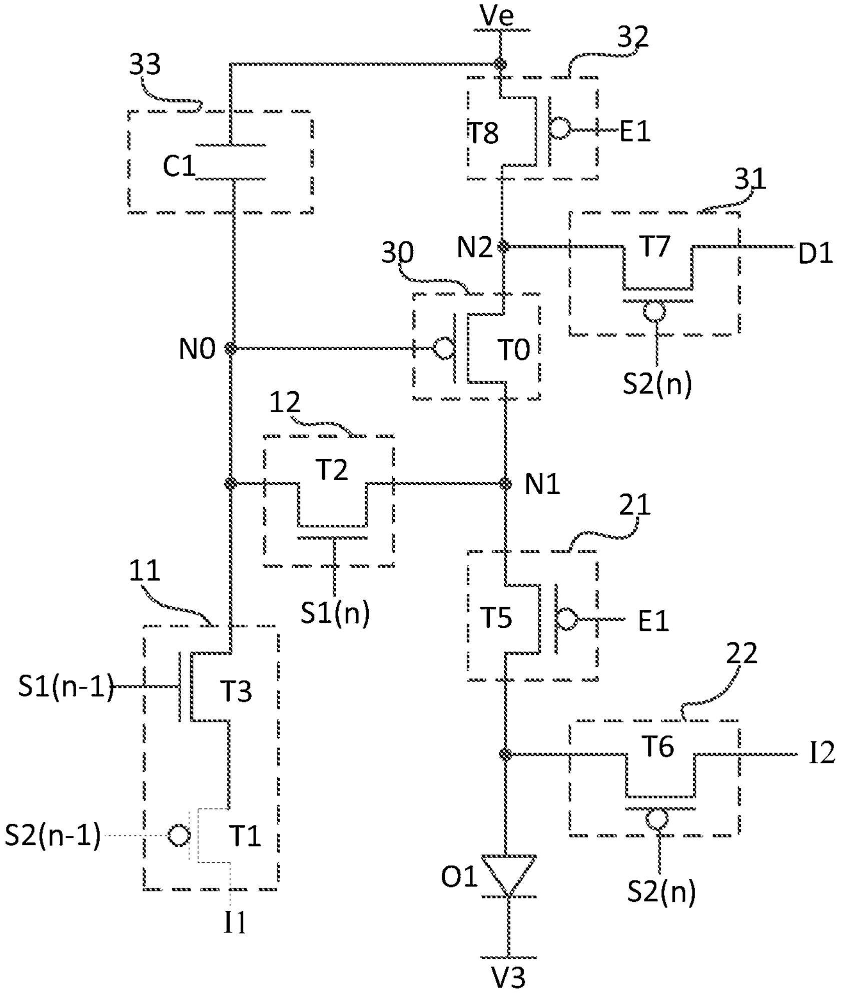
FIG. 10 is a circuit diagram of a pixel circuit according to at least one embodiment of the present disclosure.

As shown in FIG. 10, based on the embodiment of the pixel circuit shown in FIG. 3, the first initialization circuit 11 includes a first transistor T1 and a third transistor T3, and the compensation circuit 12 includes a second transistor T2; the first light emitting control circuit 21 includes a fifth transistor T5, the second initialization circuit 22 includes a sixth transistor T6; the driving circuit 30 includes a drive transistor T0, the data writing-in circuit 31 includes a seventh transistor T7, the second light emitting control circuit 32 includes an eighth transistor T8, the energy storage circuit 33 includes a storage capacitor C1; the light emitting element is an organic light emitting diode O1;

The gate electrode of T1 is electrically connected to the second scan line S2(*n*−1) in the (n−1)th row, and the source electrode of T1 is electrically connected to the first initial voltage terminal I1;

The gate electrode of T3 is electrically connected to the first scan line S1(*n*−1) in the (n−1)th row, the source electrode of T3 is electrically connected to the drain electrode of T1, and the drain electrode of T3 is electrically connected to the driving control node N0;

The gate electrode of T2 is electrically connected to the first scan line S1(*n*) in the nth row, the source electrode of T2 is electrically connected to the driving control node N0, and the drain electrode of T2 is electrically connected to the first node N1;

The gate electrode of T5 is electrically connected to the light emitting control line E1, the source electrode of T5 is electrically connected to the first node N1, the drain electrode of T5 is electrically connected to the anode of O1; the cathode of O1 is electrically connected to the low voltage terminal V3;

The gate electrode of T6 is electrically connected to the second scan line S2(*n*) in the nth row, the source electrode of T6 is electrically connected to the second initial voltage terminal I2, and the drain electrode of T6 is electrically connected to the drain electrode of T5;

The gate electrode of T0 is electrically connected to the driving control node N0, the source electrode of T0 is electrically connected to the second node N2, and the drain electrode of T0 is electrically connected to the first node N1;

The gate electrode of T7 is electrically connected to the second scan line S2(*n*) in the nth row, the source electrode of T7 is electrically connected to the data line D1, and the drain electrode of T7 is electrically connected to the second node N2;

The gate electrode of T8 is electrically connected to the light emitting control line E1, the source electrode of T8 is electrically connected to the power supply voltage terminal Ve, and the drain electrode of T8 is electrically connected to the second node N2;

In at least one embodiment of the pixel circuit shown in FIGS. 10, T2 and T3 are n-type transistors, T1, T5, T6, T7, T8 and T0 are all p-type transistors; T2 and T3 are oxide thin film transistors, and T1, T5, T6, T7, T8 and T0 are all low temperature polysilicon thin film transistors; the first voltage terminal is the low voltage terminal V3, and the second voltage terminal is the power supply voltage terminal Ve; but not limited thereto.

In at least one embodiment of the pixel circuit shown in FIG. 10, for the driving control node N0, there are two current leakage paths: a first current leakage path from N0 to I1, and a second current leakage path from N0 to I2;

In the first current leakage path from N0 to I1, there are two transistors, and oxide thin film transistors are included to be able to effectively prevent from the current leakage; and, in the second current leakage path from N0 to I2, there are three transistors, and three oxide thin film transistors are included to effectively prevent from the current leakage;

In addition, the gate electrode of T1 is electrically connected to the second scan line S2(*n*−1) in the (n−1)th row, and the gate electrode of T2 is electrically connected to the first scan line S1(*n*−1) in the (n−1)th row, so it is not necessary to add a signal line, and the scan line can be shared with the previous row of pixel circuits, which can save layout space (the pixel circuit shown in FIG. 10 can be the nth row of pixel circuits included in the display device, and n is positive integer).

In at least one embodiment of the pixel circuit shown in FIG. 10, the first initial voltage provided by I1 may be greater than the second initial voltage provided by I2. Since there are two transistors in the first current leakage path, and three transistors in the second current leakage path, so the first initial voltage can be greater than the second initial voltage (for example, the voltage value of the first initial voltage can be about −2.2V, and the voltage value of the second initial voltage can be about −2.5V), so that the voltage difference between the driving control node N0 and the first initial voltage terminal I1 is small, and the current leakage phenomenon is improved;

When the pixel circuit is in the high-brightness display mode, since the voltage value of the low-voltage signal provided by the low-voltage terminal V3 is correspondingly reduced to achieve high brightness, the voltage value of the second initial voltage can also be correspondingly reduced (at this time the voltage value of the second initial voltage may be related to the voltage value of the low voltage signal provided by V3), and the voltage value of the first initial voltage may be greater than the voltage value of the second initial voltage to reduce or minimize the current leakage from N0 to I1;

When the pixel circuit is in the low-brightness display mode, since the voltage value of the low-voltage signal provided by the low-voltage terminal V3 is correspondingly increased to achieve low brightness, the voltage value of the second initial voltage can also be correspondingly increased (the voltage value of the second initial voltage may be related to the voltage value of the low voltage signal provided by V3), and the voltage value of the second initial voltage may be greater than the voltage value of the first initial voltage, the current leakage from the driving control node to the second initial voltage terminal is decreased accordingly.

Figure 11:
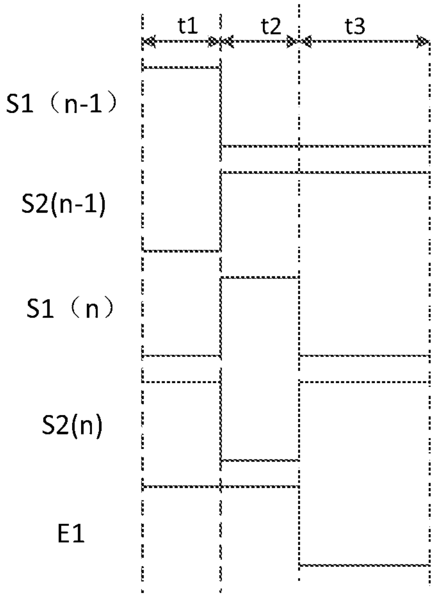
FIG. 11 is a working timing diagram of the pixel circuit as shown in FIG. 10 according to at least one embodiment of the present disclosure.

As shown in FIG. 11, when at least one embodiment of the pixel circuit shown in FIG. 10 of the present disclosure is in operation, the display period includes an initialization phase t1, a data writing-in phase t2 and a light emitting phase t3 which are set in sequence;

In the initialization phase t1, S1(*n*−1) provides a high voltage signal, S2(*n*−1) provides a low voltage signal, S1(*n*) provides a low voltage signal, S2(*n*) provides a high voltage signal, and E1 provides a high voltage signal, T2, T5, T6, T7 and T8 are all turned off; T1 and T3 are turned on to write the first initial voltage into the driving control node N0, so that T0 can be turned on when the data writing-in phase begins;

In the data writing-in phase t2, S1(*n*−1) provides a low voltage signal, S2(*n*−1) provides a high voltage signal, S1(*n*) provides a high voltage signal, S2(*n*) provides a low voltage signal, and E1 provides a high voltage signal, T1 and T3 are turned off, T2 is turned on, T6 and T7 are turned on, the data line D1 writes the data voltage Vd into the second node N2, and I2 writes the second initial voltage into the anode of O1 to clear the residual charge of the anode of O1, and control O1 not to emit light;

At the beginning of the data writing-in phase t2, T0 is turned on to charge C1 through Vd to raise the potential of N0 until T0 is turned off, and the potential of N0 becomes Vd+Vth, where Vth is the threshold voltage of T0, so that the threshold voltage is compensated;

In the light emitting phase t3, S1(*n*−1) provides a low voltage signal, S2(*n*−1) provides a high voltage signal, S1(*n*) provides a low voltage signal, S2(*n*) provides a high voltage signal, and E1 provides a low voltage signal, T1, T3, T2, T6 and T7 are all turned off, T5 and T8 are all turned on, T0 drives O1 to emit light, and the driving current for T0 to drive O1 is not related to Vth.

Figure 12:
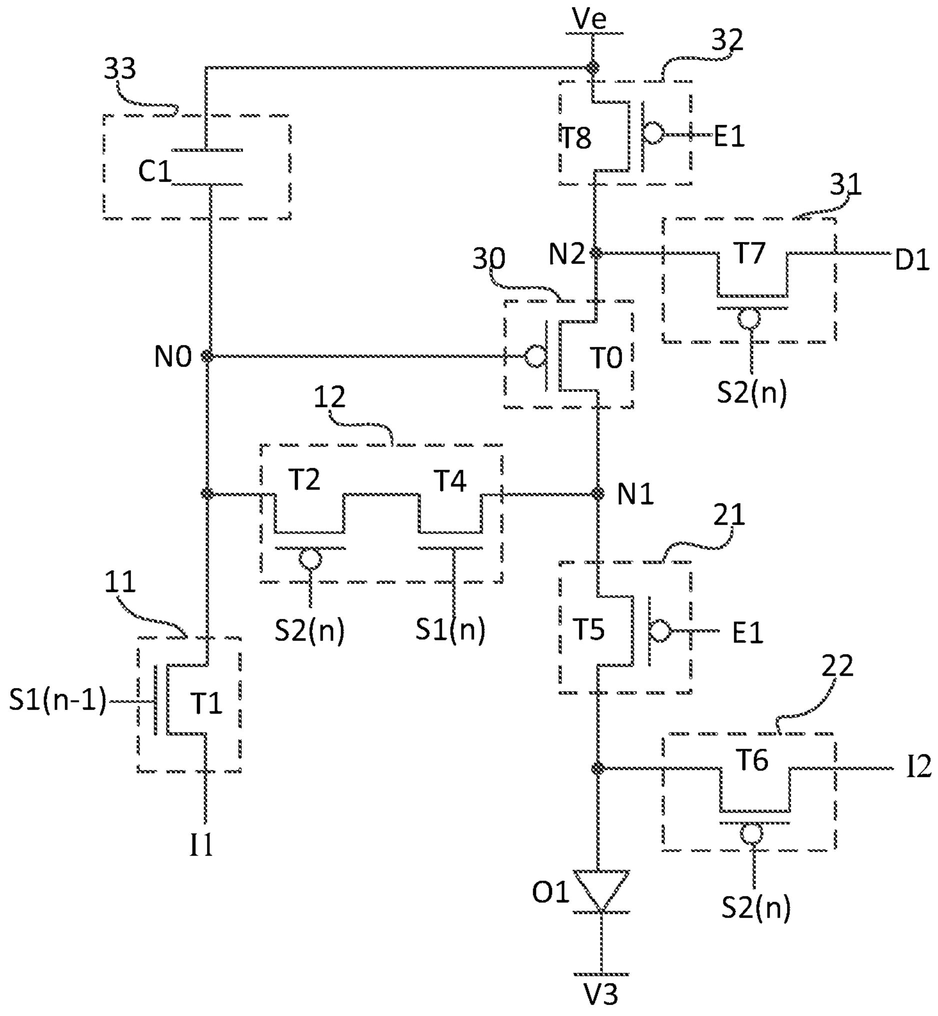
FIG. 12 is a circuit diagram of a pixel circuit according to at least one embodiment of the present disclosure.

As shown in FIG. 12, on the basis of the embodiment of the pixel circuit shown in FIG. 3, the first initialization circuit 11 includes a first transistor T1, and the compensation circuit 12 includes a second transistor T2 and a fourth transistor T4; the first light emitting control circuit 21 includes a fifth transistor T5, the second initialization circuit 22 includes a sixth transistor T6; the driving circuit 30 includes a driving transistor T0, the data writing-in circuit 31 includes a seventh transistor T7, the second light emitting control circuit 32 includes an eighth transistor T8, the energy storage circuit 33 includes a storage capacitor C1; the light emitting element is an organic light emitting diode O1;

The gate electrode of T1 is electrically connected to the first scan line S1(*n*−1) in the (n−1)th row, the source electrode of T1 is electrically connected to the first initial voltage terminal I1, and the drain electrode of T1 is electrically connected to the driving control node N0;

The gate electrode of T2 is electrically connected to the second scan line S2(*n*) in the nth row, and the source electrode of T2 is electrically connected to the driving control node N0;

The gate electrode of T4 is electrically connected to the first scan line S1(*n*) in the nth row, the source electrode of T4 is electrically connected to the drain electrode of T2, and the drain electrode of T4 is electrically connected to the first node N1;

The gate electrode of T5 is electrically connected to the light emitting control line E1, the source electrode of T5 is electrically connected to the first node N1, the drain electrode of T5 is electrically connected to the anode of O1; the cathode of O1 is electrically connected to the low voltage terminal V3;

The gate electrode of T6 is electrically connected to the second scan line S2(*n*) in the nth row, the source electrode of T6 is electrically connected to the second initial voltage terminal I2, and the drain electrode of T6 is electrically connected to the drain electrode of T5;

The gate electrode of T0 is electrically connected to the driving control node N0, the source electrode of T0 is electrically connected to the second node N2, and the drain electrode of T0 is electrically connected to the first node N1;

The gate electrode of T7 is electrically connected to the second scan line S2(*n*) in the nth row, the source electrode of T7 is electrically connected to the data line D1, and the drain electrode of T7 is electrically connected to the second node N2;

The gate electrode of T8 is electrically connected to the light emitting control line E1, the source electrode of T8 is electrically connected to the power supply voltage terminal Ve, and the drain electrode of T8 is electrically connected to the second node N2;

The first terminal of C1 is electrically connected to the power supply voltage terminal Ve, and the second terminal of C1 is electrically connected to the driving control node N0.

In at least one embodiment of the pixel circuit shown in FIGS. 12, T1 and T4 are n-type transistors, T2, T5, T6, T7, T8 and T0 are all p-type transistors; T1 is an oxide thin film transistor, T2, T5, T6, T7, T8 and T0 are all low temperature polysilicon thin film transistors; the first voltage terminal is the low voltage terminal V3, and the second voltage terminal is the power supply voltage terminal Ve; but not limited thereto.

In at least one embodiment of the pixel circuit shown in FIG. 12, there are two current leakage paths to the driving control node N0: a first current leakage path from N0 to I1, and a second current leakage path from N0 to I2;

In the first current leakage path from N0 to I1, there is an oxide thin film transistor to effectively prevent from current leakage; and, in the second current leakage path from N0 to I2, an oxide thin film transistor is also included, which can effectively prevent the current leakage;

In the second current leakage path, four transistors are used, and the number of transistors included in the second current leakage path is increased to improve the current leakage phenomenon;

In addition, the gate electrode of T2 is electrically connected to the second scan line S2(*n*) in the nth row, and the gate electrode of T4 is electrically connected to the first scan line S1(*n*) in the nth row. There is no need to add a signal line, which can save layout space.

In at least one embodiment of the pixel circuit shown in FIG. 12, the first initial voltage provided by I1 may be greater than the second initial voltage provided by I2 (for example, the voltage value of the first initial voltage may be about −2.2V, the voltage value of the second initial voltage can be about −2.5V), since there is one transistor in the first current leakage path and four transistors in the second current leakage path, the first initial voltage can be greater than the second initial voltage, so that the voltage difference between the driving control node N0 and the first initial voltage terminal I1 is small, and the current leakage phenomenon is improved;

When the pixel circuit is in the high-brightness display mode, since the voltage value of the low-voltage signal provided by the low-voltage terminal V3 is correspondingly reduced to achieve high brightness, the voltage value of the second initial voltage can also be correspondingly reduced (at this time the voltage value of the second initial voltage may be related to the voltage value of the low voltage signal provided by V3), and the voltage value of the first initial voltage may be greater than the voltage value of the second initial voltage to reduce or minimize the current leakage from N0 to I1;

When the pixel circuit is in the low-brightness display mode, since the voltage value of the low-voltage signal provided by the low-voltage terminal V3 is correspondingly increased to achieve low brightness, the voltage value of the second initial voltage can also be correspondingly increased (the voltage value of the second initial voltage may be related to the voltage value of the low voltage signal provided by V3), and the voltage value of the second initial voltage may be greater than the voltage value of the first initial voltage, the current leakage from the driving control node to the second initial voltage terminal is decreased accordingly.

Figure 13:
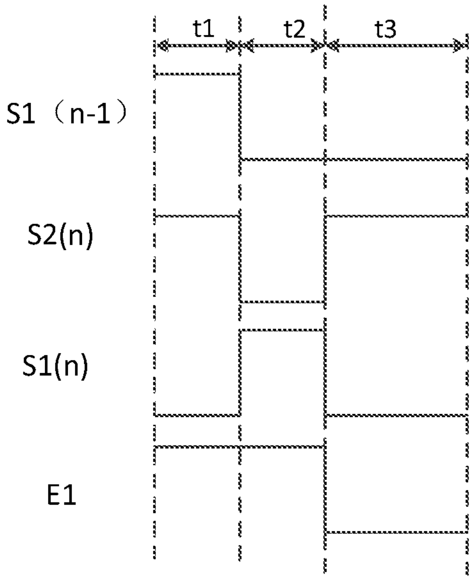
FIG. 13 is a working timing diagram of the pixel circuit as shown in FIG. 12 according to at least one embodiment of the present disclosure.

As shown in FIG. 13, during operation of at least one embodiment of the pixel circuit shown in FIG. 12 of the present disclosure, the display period includes an initialization phase t1, a data writing-in phase t2 and a light emitting phase t3 which are set in sequence;

In initialization phase t1, S1(*n*−1) provides a high voltage signal, S2(*n*) provides a high voltage signal, S1(*n*) provides a low voltage signal, E1 provides a high voltage signal, T2, T4, T5, T6, T7 and T8 are all turned off; T1 is turned on to write the first initial voltage into the driving control node N0, so that T0 can be turned on when the data writing-in phase begins;

In the data writing-in phase t2, S1(*n*−1) provides a low voltage signal, S2(*n*) provides a low voltage signal, S1(*n*) provides a high voltage signal, E1 provides a high voltage signal, T1 is turned off, and T2 and T4 are turned on, T6 and T7 are turned on, the data line D1 writes the data voltage Vd into the second node N2, and I2 writes the second initial voltage into the anode of O1 to clear the residual charge of the anode of O1 and control O1 not to emit light;

At the beginning of the data writing-in phase t2, T0 is turned on to charge C1 through Vd to raise the potential of N0 until T0 is turned off, and the potential of N0 becomes Vd+Vth, where Vth is the threshold voltage of T0, so that the threshold voltage is compensated;

In the light emitting phase t3, S1(*n*−1) provides a low voltage signal, S2(*n*) provides a high voltage signal, S1(*n*) provides a low voltage signal, E1 provides a low voltage signal, T1, T2, T4, T6 and T7 are all turned off, both T5 and T8 are turned on, T0 drives O1 to emit light, and the driving current for T0 to drive O1 is not related to Vth.

Figure 14:
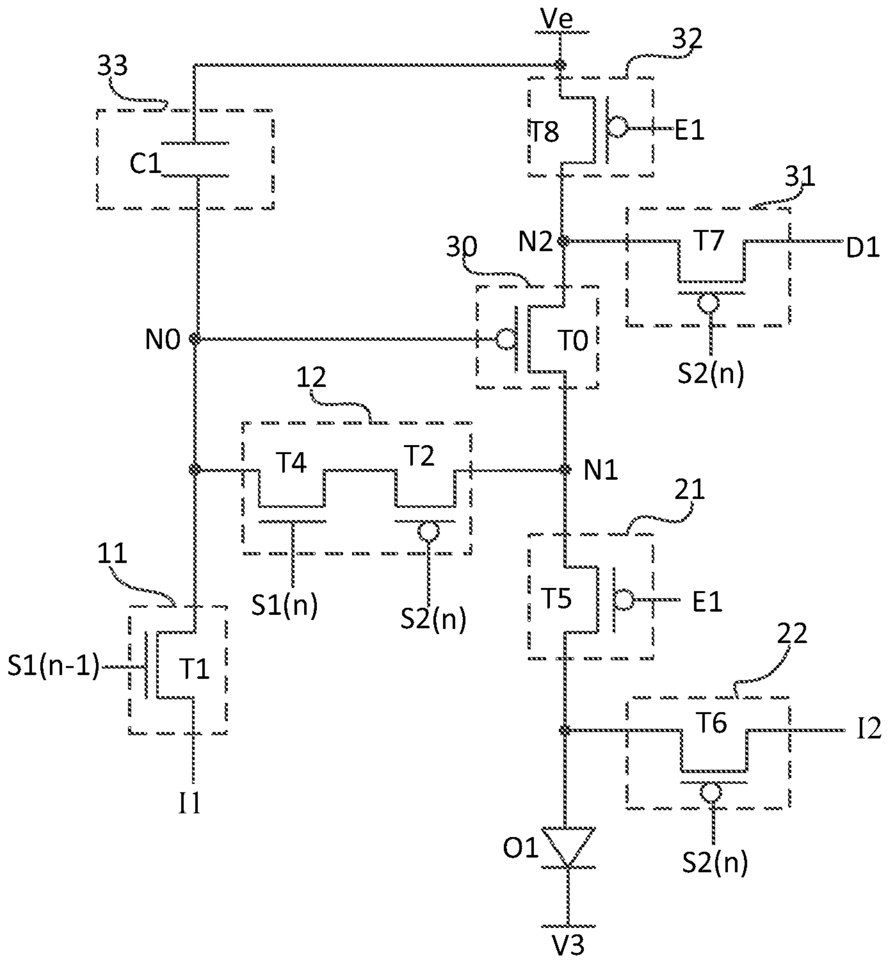
FIG. 14 is a circuit diagram of a pixel circuit according to at least one embodiment of the present disclosure.

As shown in FIG. 14, on the basis of the embodiment of the pixel circuit shown in FIG. 3, the first initialization circuit 11 includes a first transistor T1, and the compensation circuit 12 includes a second transistor T2 and a fourth transistor T4; the first light emitting control circuit 21 includes a fifth transistor T5, the second initialization circuit 22 includes a sixth transistor T6; the driving circuit 30 includes a driving transistor T0, the data writing-in circuit 31 includes a seventh transistor T7, the second light emitting control circuit 32 includes an eighth transistor T8, the energy storage circuit 33 includes a storage capacitor C1; the light emitting element is an organic light emitting diode O1;

The gate electrode of T1 is electrically connected to the first scan line S1(*n*−1) in the (n−1)th row, the source electrode of T1 is electrically connected to the first initial voltage terminal I1, and the drain electrode of T1 is electrically connected to the driving control node N0;

The gate electrode of T4 is electrically connected to the first scan line S1(*n*) in the nth row, and the source electrode of T4 is electrically connected to the driving control node N0;

The gate electrode of T2 is electrically connected to the second scan line S2(*n*) in the nth row, the source electrode of T2 is electrically connected to the drain electrode of T4, and the drain electrode of T2 is electrically connected to the first node N1;

The gate electrode of T5 is electrically connected to the light emitting control line E1, the source electrode of T5 is electrically connected to the first node N1, the drain electrode of T5 is electrically connected to the anode of O1; the cathode of O1 is electrically connected to the low voltage terminal V3;

The gate electrode of T6 is electrically connected to the second scan line S2(*n*) in the nth row, the source electrode of T6 is electrically connected to the second initial voltage terminal I2, and the drain electrode of T6 is electrically connected to the drain electrode of T5;

The gate electrode of T0 is electrically connected to the driving control node N0, the source electrode of T0 is electrically connected to the second node N2, and the drain electrode of T0 is electrically connected to the first node N1;

The gate electrode of T7 is electrically connected to the second scan line S2(*n*) in the nth row, the source electrode of T7 is electrically connected to the data line D1, and the drain electrode of T7 is electrically connected to the second node N2;

The gate electrode of T8 is electrically connected to the light emitting control line E1, the source electrode of T8 is electrically connected to the power supply voltage terminal Ve, and the drain electrode of T8 is electrically connected to the second node N2;

The first terminal of C1 is electrically connected to the power supply voltage terminal Ve, and the second terminal of C1 is electrically connected to the driving control node N0.

In at least one embodiment of the pixel circuit shown in FIGS. 14, T1 and T4 are n-type transistors, T2, T5, T6, T7, T8 and T0 are all p-type transistors; T1 is an oxide thin film transistor, T2, T5, T6, T7, T8 and T0 are all low temperature polysilicon thin film transistors; the first voltage terminal is the low voltage terminal V3, and the second voltage terminal is the power supply voltage terminal Ve; but not limited thereto.

In at least one embodiment of the pixel circuit shown in FIG. 14, there are two current leakage paths for the driving control node N0: a first current leakage path from N0 to I1, and a second current leakage path from N0 to I2;

In the first current leakage path from N0 to I1, there is one oxide thin film transistor to effectively prevent the current leakage; and, in the second leakage path from N0 to I2, an oxide thin film transistor is also included, which can effectively prevent the current leakage;

In the second current leakage path, four transistors are used, and the number of transistors included in the second current leakage path is increased to improve the current leakage phenomenon;

In addition, the gate electrode of T2 is electrically connected to the second scan line S2(*n*) in the nth row, and the gate electrode of T4 is electrically connected to the first scan line S1(*n*) in the nth row. There is no need to add a signal line, which can save layout space.

In at least one embodiment of the pixel circuit shown in FIG. 14,

The first initial voltage provided by I1 may be greater than the second initial voltage provided by I2 (for example, the voltage value of the first initial voltage may be about −2.2V, and the voltage value of the second initial voltage may be about −2.5V). There is one transistor in the first current leakage path, and there are four transistors in the second current leakage path, so the first initial voltage may be greater than the second initial voltage, so that the voltage difference between the driving control node N0 and the first initial voltage terminal I1 is small, and the current leakage phenomenon is improved;

When the pixel circuit is in the high-brightness display mode, since the voltage value of the low-voltage signal provided by the low-voltage terminal V3 is correspondingly reduced to achieve high brightness, the voltage value of the second initial voltage can also be correspondingly reduced (at this time the voltage value of the second initial voltage may be related to the voltage value of the low voltage signal provided by V3), and the voltage value of the first initial voltage may be greater than the voltage value of the second initial voltage to reduce or minimize the current leakage from N0 to I1;

When the pixel circuit is in the low-brightness display mode, since the voltage value of the low-voltage signal provided by the low-voltage terminal V3 is correspondingly increased to achieve low brightness, the voltage value of the second initial voltage can also be correspondingly increased (the voltage value of the second initial voltage may be related to the voltage value of the low voltage signal provided by V3), and the voltage value of the second initial voltage may be greater than the voltage value of the first initial voltage, the current leakage from the driving control node to the second initial voltage terminal is decreased accordingly.

Figure 15:
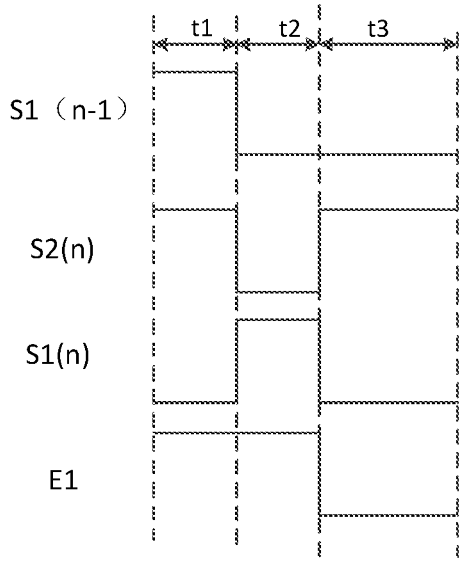
FIG. 15 is a working timing diagram of the pixel circuit as shown in FIG. 14 according to at least one embodiment of the present disclosure.

As shown in FIG. 15, when at least one embodiment of the pixel circuit shown in FIG. 14 of the present disclosure is in operation, the display period includes an initialization phase t1, a data writing-in phase t2 and a light emitting phase t3 which are set in sequence;

In initialization phase t1, S1(*n*−1) provides a high voltage signal, S2(*n*) provides a high voltage signal, S1(*n*) provides a low voltage signal, E1 provides a high voltage signal, T2, T4, T5, T6, T7 and T8 are all turned off; T1 is turned on to write the first initial voltage into the driving control node N0, so that T0 can be turned on when the data writing-in phase begins;

In the data writing-in phase t2, S1(*n*−1) provides a low voltage signal, S2(*n*) provides a low voltage signal, S1(*n*) provides a high voltage signal, E1 provides a high voltage signal, T1 is turned off, and T2 and T4 are turned on, T6 and T7 are turned on, the data line D1 writes the data voltage Vd into the second node N2, and I2 writes the second initial voltage into the anode of O1 to clear the residual charge of the anode of O1 and control O1 not to emit light;

At the beginning of the data writing-in phase t2, T0 is turned on to charge C1 through Vd to raise the potential of N0 until T0 is turned off, and the potential of N0 becomes Vd+Vth, where Vth is the threshold voltage of T0, so that the threshold voltage is compensated;

In the light emitting phase t3, S1(*n*−1) provides a low voltage signal, S2(*n*) provides a high voltage signal, S1(*n*) provides a low voltage signal, E1 provides a low voltage signal, T1, T2, T4, T6 and T7 are all turned off, both T5 and T8 are turned on, T0 drives O1 to emit light, and the driving current for T0 to drive O1 is not related to Vth.

The pixel driving method described in the embodiment of the present disclosure is applied to the above-mentioned pixel circuit, and the display period includes an initialization phase and a data writing-in phase that are set in sequence; the pixel driving method includes:

In the initialization stage, under the control of the initial control signal provided by the initial control line, controlling, by the first initialization circuit, the first initial voltage terminal to write the first initial voltage into the driving control node, so that the driving transistor in the pixel circuit can be turned on when the data writing-in phase starts;

In the data writing-in stage, under the control of the compensation control signal provided by the compensation control line, controlling, by the compensation circuit, the driving control node to be connected to the first node to perform threshold voltage compensation.

In at least one embodiment of the present disclosure, the pixel circuit further includes a light emitting element, a first light emitting control circuit, and a second initialization circuit; the display period further includes a light emitting phase set after the data writing-in phase; the pixel driving method described in the embodiment further includes:

In the data writing-in phase, under the control of the writing-in control signal, controlling, by the second initialization circuit, the second initial voltage terminal to write the second initial voltage into the first electrode of the light emitting element;

In the light emitting phase, under the control of the light emitting control signal provided by the light emitting control line, controlling, by the first light emitting control circuit, the first node to be connected to the first electrode of the light emitting element.

In specific implementation, since the numbers of transistors included in the two current leakage paths of the driving control node are different (the number of transistors in the first current leakage path from the driving control node to the first initial voltage terminal is smaller than the number of transistors in the second current leakage path from the driving control node to the second initial voltage terminal), the first initial voltage can be set to be greater than the second initial voltage, so that the voltage difference between the driving control node and the first initial voltage terminal is small, to improve the current leakage phenomenon;

When the pixel circuit works in the high brightness mode, since the voltage value of the second initial voltage decreases with the voltage value of the voltage signal connected to the second electrode of the light emitting element, the voltage value of the first initial voltage may be greater than that of the second initial voltage, to reduce or minimize the current leakage from the driving control node to the first initial voltage terminal; when the pixel circuit works in the low brightness mode, since the voltage value of the second initial voltage increases with the voltage value of the voltage signal connected to the second electrode of the light emitting element, the voltage value of the second initial voltage may be greater than the voltage value of the first initial voltage, and the leakage current from the driving control node to the second initial voltage terminal decreases accordingly.

The display device according to the embodiment of the present disclosure includes the above-mentioned pixel circuit.

The display device provided by at least one embodiment of the present disclosure may be any product or component with a display function, such as a mobile phone, a tablet computer, a TV, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a first initialization circuit, a compensation circuit and a data writing-in circuit, wherein:

the first initialization circuit is electrically connected to an initial control line, a first initial voltage terminal and a driving control node, and is configured to control the first initial voltage terminal to write a first initial voltage into the driving control node under the control of an initial control signal provided by the initial control line;

the compensation circuit is electrically connected to a compensation control line, the driving control node and a first node, and is configured to control the driving control node to be connected to the first node under the control of a compensation control signal provided by the compensation control line;

one of the first initialization circuit and the compensation circuit comprises a low temperature polysilicon thin film transistor and an oxide transistor connected in series, and the other of the first initialization circuit and the compensation circuit only comprises an oxide thin film transistor;

the data writing-in circuit is electrically connected to a writing-in control line, a data line and a second node respectively, and is configured to, under the control of a writing-in control signal provided by the writing-in control line, control to write a data voltage on the data line into the second node;

the first initialization circuit comprises a first transistor and a third transistor, the compensation circuit comprises a second transistor, and the data writing-in circuit comprises a seventh transistor; and the third transistor is an oxide transistor; wherein a control electrode of the third transistor is electrically connected to a first scan line in an (n−1)th row, where n is a positive integer;

a control electrode of the first transistor is electrically connected to the initial control line;

a control electrode of the second transistor is electrically connected to the compensation control line;

a control electrode of the seventh transistor is electrically connected to the writing-in control line;

the initial control line is a second scan line in the (n−1)th row, the compensation control line is a first scan line in an nth row, the writing-in control line is a second scan line in an nth row;

the first scan line in the nth row and the first scan line in the (n−1)th row have a same waveform with a shifted phase, the second scan line in the nth row and the second scan line in the (n−1)th row have a same waveform with the shifted phase; and a display period of the pixel circuit comprises an initialization stage and a data writing-in stage that are set in sequence;

in the initialization stage and the data writing-in stage, a turning-on period of the first transistor and the third transistor does not overlap a turning-on period of the second transistor and the seventh transistor;

or, the first initialization circuit comprises a first transistor, the compensation circuit comprises a second transistor and a fourth transistor; and the data writing-in circuit comprises a seventh transistor; and the first transistor is an oxide transistor; wherein a control electrode of the first transistor is electrically connected to the initial control line;

a control electrode of the second transistor is electrically connected to the compensation control line, and a first electrode of the second transistor is electrically connected to the driving control node;

a control electrode of the fourth transistor is electrically connected to a first scan line in an nth row; where n is a positive integer; a first electrode of the fourth transistor is merely electrically connected to the second electrode of the second transistor, and a second electrode of the fourth transistor is electrically connected to the first node;

a control electrode of the seventh transistor is electrically connected to the writing-in control line;

or, a control electrode of the first transistor is electrically connected to the initial control line;

a control electrode of the second transistor is electrically connected to the compensation control line, a first electrode of the second transistor is merely electrically connected to a second electrode of the fourth transistor, and a second electrode of the second transistor is electrically connected to the first node;

a control electrode of the fourth transistor is electrically connected to a first scan line in an nth row, and a first electrode of the fourth transistor is electrically connected to the driving control node;

a control electrode of the seventh transistor is electrically connected to the writing-in control line; and wherein the second transistor and the seventh transistor are p-type transistors, and the first transistor and the fourth transistor are n-type transistors, the initial control line is a first scan line in an (n−1)th row, and the compensation control line is a second scan line in the nth row; the writing-in control line is a second scan line in an nth row;

the first scan line in the nth row and the first scan line in the (n−1)th row have a same waveform with a shifted phase, the second scan line in the nth row and the second scan line in the (n−1)th row have a same waveform with the shifted phase; and a display period of the pixel circuit comprises an initialization stage and a data writing-in stage that are set in sequence;

in the initialization stage and the data writing-in stage, a turning-on period of the first transistor does not overlap a turning-on period of the second transistor, the fourth transistor and the seventh transistor.

2. The pixel circuit according to claim 1, wherein the first initialization circuit comprises a first transistor, and the compensation circuit comprises a second transistor;

a control electrode of the first transistor is electrically connected to the initial control line, a first electrode of the first transistor is electrically connected to the first initial voltage terminal, and a second electrode of the first transistor is electrically connected to the driving control node;

a control electrode of the second transistor is electrically connected to the compensation control line, a first electrode of the second transistor is electrically connected to the driving control node, and a second electrode of the second transistor is electrically connected to the first node;

the first transistor is a low temperature polysilicon thin film transistor, the second transistor is an oxide thin film transistor, the compensation control line is a first scan line in an nth row, and the initial control line is a second scan line in an (n−1)th row, or the second transistor is a low temperature polysilicon thin film transistor, the first transistor is an oxide thin film transistor, the initial control line is a first scan line in the (n−1)th row, and the compensation control line is a second scan line in the nth row; n is a positive integer.

3. The pixel circuit according to claim 2, wherein, when the first transistor is the low temperature polysilicon thin film transistor and the second transistor is the oxide thin film transistor, the first transistor is a dual-gate transistor;

when the second transistor is the low temperature polysilicon thin film transistor and the first transistor is the oxide thin film transistor, the second transistor is a double-gate transistor.

4. The pixel circuit according to claim 3, further comprising a light emitting element, a first light emitting control circuit and a second initialization circuit;

the first light emitting control circuit is electrically connected to a light emitting control line, the first node and a first electrode of the light emitting element, and is configured to, under the control of a light emitting control signal provided by the light emitting control line, control the first node to be connected to the first electrode of the light emitting element;

the second initialization circuit is electrically connected to the writing-in control line, the first electrode of the light emitting element and a second initial voltage terminal, and is configured to control the second initial voltage terminal to write a second initial voltage into the first electrode of the light emitting element under the control of a writing-in control signal provided by the writing-in control line;

a second electrode of the light emitting element is electrically connected to a first voltage terminal.

5. The pixel circuit according to claim 2, further comprising a light emitting element, a first light emitting control circuit and a second initialization circuit;

the first light emitting control circuit is electrically connected to a light emitting control line, the first node and a first electrode of the light emitting element, and is configured to, under the control of a light emitting control signal provided by the light emitting control line, control the first node to be connected to the first electrode of the light emitting element;

the second initialization circuit is electrically connected to the writing-in control line, the first electrode of the light emitting element and a second initial voltage terminal, and is configured to control the second initial voltage terminal to write a second initial voltage into the first electrode of the light emitting element under the control of a writing-in control signal provided by the writing-in control line;

a second electrode of the light emitting element is electrically connected to a first voltage terminal.

6. The pixel circuit according to claim 1, wherein a first electrode of the third transistor is electrically connected to the first initial voltage terminal;

a first electrode of the first transistor is electrically connected to a second electrode of the third transistor, and a second electrode of the first transistor is electrically connected to the driving control node;

a first electrode of the second transistor is electrically connected to the driving control node, and the second electrode of the second transistor is electrically connected to the first node;

the first transistor is a low temperature thin film polysilicon transistor, and both the second transistor and the third transistor are oxide thin film transistors.

7. The pixel circuit according to claim 6, further comprising a light emitting element, a first light emitting control circuit and a second initialization circuit;

the first light emitting control circuit is electrically connected to a light emitting control line, the first node and a first electrode of the light emitting element, and is configured to, under the control of a light emitting control signal provided by the light emitting control line, control the first node to be connected to the first electrode of the light emitting element;

the second initialization circuit is electrically connected to the writing-in control line, the first electrode of the light emitting element and a second initial voltage terminal, and is configured to control the second initial voltage terminal to write a second initial voltage into the first electrode of the light emitting element under the control of a writing-in control signal provided by the writing-in control line;

a second electrode of the light emitting element is electrically connected to a first voltage terminal.

8. The pixel circuit according to claim 1, wherein a first electrode of the first transistor is electrically connected to the first initial voltage terminal;

a first electrode of the third transistor is electrically connected to a second electrode of the first transistor, and a second electrode of the third transistor is electrically connected to the driving control node;

a first electrode of the second transistor is electrically connected to the driving control node, and a second electrode of the second transistor is electrically connected to the first node;

the first transistor is a low temperature thin film polysilicon transistor, and both the second transistor and the third transistor are oxide thin film transistors.

9. The pixel circuit according to claim 8, further comprising a light emitting element, a first light emitting control circuit and a second initialization circuit;

the first light emitting control circuit is electrically connected to a light emitting control line, the first node and a first electrode of the light emitting element, and is configured to, under the control of a light emitting control signal provided by the light emitting control line, control the first node to be connected to the first electrode of the light emitting element;

the second initialization circuit is electrically connected to the writing-in control line, the first electrode of the light emitting element and a second initial voltage terminal, and is configured to control the second initial voltage terminal to write a second initial voltage into the first electrode of the light emitting element under the control of a writing-in control signal provided by the writing-in control line;

a second electrode of the light emitting element is electrically connected to a first voltage terminal.

10. The pixel circuit according to claim 1, further comprising a light emitting element, a first light emitting control circuit and a second initialization circuit;

the first light emitting control circuit is electrically connected to a light emitting control line, the first node and a first electrode of the light emitting element, and is configured to, under the control of a light emitting control signal provided by the light emitting control line, control the first node to be connected to the first electrode of the light emitting element;

the second initialization circuit is electrically connected to the writing-in control line, the first electrode of the light emitting element and a second initial voltage terminal, and is configured to control the second initial voltage terminal to write a second initial voltage into the first electrode of the light emitting element under the control of a writing-in control signal provided by the writing-in control line;

a second electrode of the light emitting element is electrically connected to a first voltage terminal.

11. The pixel circuit according to claim 10, wherein the first light emitting control circuit comprises a fifth transistor, and the second initialization circuit comprises a sixth transistor;

a control electrode of the fifth transistor is electrically connected to the light emitting control line, a first electrode of the fifth transistor is electrically connected to the first node, and a second electrode of the fifth transistor is electrically connected to the first electrode of the light emitting element;

a control electrode of the sixth transistor is electrically connected to the writing-in control line, a first electrode of the sixth transistor is electrically connected to the second initial voltage terminal, and a second electrode of the sixth transistor is electrically connected to the first electrode of the light emitting element;

both the fifth transistor and the sixth transistor are low temperature polysilicon thin film transistors.

12. The pixel circuit according to claim 10, wherein the pixel circuit further comprises a driving circuit, a second light emitting control circuit and an energy storage circuit;

a control terminal of the driving circuit is electrically connected to the driving control node, a first terminal of the driving circuit is electrically connected to a second node, and a second terminal of the driving circuit is electrically connected to the first node, and the driving circuit is used to generate a driving current under the control of a potential of the control terminal of the driving circuit;

the second light emitting control circuit is electrically connected to the light emitting control line, a second voltage terminal and the second node, and is configured to, under the control of the light emitting control signal provided by the light emitting control line, control the second voltage terminal to be connected to the second node;

a first terminal of the energy storage circuit is electrically connected to the second voltage terminal, a second terminal of the energy storage circuit is electrically connected to the driving control node, and the energy storage circuit is configured to store electrical energy.

13. The pixel circuit according to claim 12, wherein the driving circuit comprises a driving transistor, the second light emitting control circuit comprises an eighth transistor, and the energy storage circuit comprises a storage capacitor;

a control electrode of the driving transistor is electrically connected to the driving control node, a first electrode of the driving transistor is electrically connected to the second node, and a second electrode of the driving transistor is electrically connected to the first node;

a first electrode of the seventh transistor is electrically connected to the data line, and a second electrode of the seventh transistor is electrically connected to the second node;

a control electrode of the eighth transistor is electrically connected to the light emitting control line, a first electrode of the eighth transistor is electrically connected to the second voltage terminal, and a second electrode of the eighth transistor is electrically connected to the second node;

a first terminal of the storage capacitor is electrically connected to the second voltage terminal, and a second terminal of the energy storage circuit is electrically connected to the driving control node;

the driving transistor, the seventh transistor and the eighth transistor are all low temperature polysilicon thin film transistors.

14. A pixel driving method, applied to the pixel circuit according to claim 1, wherein the pixel driving method comprises:

in the initialization stage, under the control of the initial control signal provided by the initial control line, controlling, by the first initialization circuit, the first initial voltage terminal to write the first initial voltage into the driving control node;

in the data writing-in stage, under the control of the compensation control signal provided by the compensation control line, controlling, by the compensation circuit, the driving control node to be connected to the first node.

15. The pixel driving method according to claim 14, wherein the pixel circuit further comprises a light emitting element, a first light emitting control circuit, and a second initialization circuit; the display period further comprises a light emitting stage set after the data writing-in stage; the pixel driving method further comprises:

in the data writing-in stage, under the control of a writing-in control signal, controlling, by the second initialization circuit, the second initial voltage terminal to write a second initial voltage into a first electrode of the light emitting element;

in the light emitting stage, under the control of a light emitting control signal provided by the light emitting control line, controlling, by the first light emitting control circuit, the first node to be connected to the first electrode of the light emitting element.

16. A display device comprising the pixel circuit according to claim 1.

* * * * *